US 9,369,845 B2

(12) United States Patent
Alizadeh-Shabdiz et al.

(10) Patent No.: US 9,369,845 B2
(45) Date of Patent: Jun. 14, 2016

(54) METHODS AND SYSTEMS OF ASSIGNING ESTIMATED POSITIONS AND ATTRIBUTES TO WIRELESS ACCESS POINTS IN A POSITIONING SYSTEM

(71) Applicant: Skyhook Wireless, Inc., Boston, MA (US)

(72) Inventors: Farshid Alizadeh-Shabdiz, Wayland, MA (US); Nicolas Brachet, Chestnut Hill, MA (US); Andrei Dancus, Nashua, NH (US); Christopher Steger, Boston, MA (US)

(73) Assignee: Skyhook Wireless, Inc., Boston, MA (US)

( * ) Notice: Subject to any disclaimer, the term of this patent is extended or adjusted under 35 U.S.C. 154(b) by 470 days.

(21) Appl. No.: 13/801,117

(22) Filed: Mar. 13, 2013

(65) Prior Publication Data

US 2013/0252631 A1    Sep. 26, 2013

Related U.S. Application Data

(60) Provisional application No. 61/614,675, filed on Mar. 23, 2012.

(51) Int. Cl.
*G01S 3/02* (2006.01)
*G01S 1/00* (2006.01)
*H04W 4/02* (2009.01)

(52) U.S. Cl.
CPC .................................... *H04W 4/025* (2013.01)

(58) Field of Classification Search
USPC ............... 342/385, 451, 457, 465; 455/456.1, 455/456.6
See application file for complete search history.

(56) References Cited

U.S. PATENT DOCUMENTS 6,249,252 B1   6/2001   Dupray
6,275,705 B1   8/2001   Drane et al.
(Continued)

FOREIGN PATENT DOCUMENTS

EP        1850606        10/2007
WO   WO-2005/088991 A1    9/2005

OTHER PUBLICATIONS

"A Practical Approach to Identifying and Tracking Unauthorized 802.11 Cards and Access Points," Interlink Networks, Inc., Apr. 2002, pp. 1-20.
(Continued)

*Primary Examiner* — Dao Phan
(74) *Attorney, Agent, or Firm* — Cesari and McKenna, LLP; James A. Blanchette

(57) ABSTRACT

Method of and systems for assigning estimated positions and attributes to wireless access points in a positioning system are disclosed. A method of estimating a characteristic of a wireless beacon includes receiving a set of data points. Each data point contains information about characteristics of a wireless beacon. The method also includes dividing at least one dimension into a set of regions in which each region of the set has region boundaries that do not overlap with other regions. The method further includes associating each data point with one corresponding region based on at least one element of the information of the data point lying within the boundaries of the corresponding region and determining an aggregate characteristic for each region based on the information of the data points associated with the corresponding region. The method estimates a characteristic of the wireless beacon based on at least one aggregate characteristic.

20 Claims, 29 Drawing Sheets

(56) References Cited

U.S. PATENT DOCUMENTS

| | | | |
|---|---|---|---|
| 6,463,290 | B1 | 10/2002 | Stilp et al. |
| 6,526,039 | B1 | 2/2003 | Dahlman et al. |
| 6,664,925 | B1 | 12/2003 | Moore et al. |
| 6,901,264 | B2 | 5/2005 | Myr |
| RE38,808 | E | 10/2005 | Schuchman et al. |
| 7,092,943 | B2 | 8/2006 | Roese et al. |
| 7,116,988 | B2 | 10/2006 | Dietrich et al. |
| 7,130,646 | B2 | 10/2006 | Wang |
| 7,133,909 | B2 | 11/2006 | Bahl |
| 7,155,239 | B2 | 12/2006 | Zeng et al. |
| 7,257,411 | B2 | 8/2007 | Gwon et al. |
| 7,305,245 | B2 | 12/2007 | Alizadeh-Shabdiz et al. |
| 7,389,114 | B2 | 6/2008 | Ju et al. |
| 7,397,424 | B2 | 7/2008 | Houri |
| 7,412,246 | B2 | 8/2008 | Lewis et al. |
| 7,440,755 | B2 | 10/2008 | Balachandran et al. |
| 7,519,470 | B2 | 4/2009 | Brasche et al. |
| 7,551,579 | B2 | 6/2009 | Alizadeh-Shabdiz et al. |
| 7,696,923 | B2 | 4/2010 | Houri |
| 7,751,828 | B2 | 7/2010 | Kim et al. |
| 7,856,234 | B2 | 12/2010 | Alizadeh-Shabdiz et al. |
| 8,085,190 | B2 | 12/2011 | Sengupta et al. |
| 8,140,094 | B2 | 3/2012 | Morgan et al. |
| 8,193,978 | B2 | 6/2012 | Moshfeghi |
| 8,224,350 | B2 | 7/2012 | Marshall et al. |
| 8,244,272 | B2 | 8/2012 | Morgan et al. |
| 8,526,368 | B2 | 9/2013 | Finlow-Bates et al. |
| 8,559,974 | B2 | 10/2013 | Alizadeh-Shabdiz et al. |
| 8,630,657 | B2 | 1/2014 | Alizadeh-Shabdiz et al. |
| 8,700,053 | B2 | 4/2014 | Alizadeh-Shabdiz et al. |
| 2004/0203926 | A1 | 10/2004 | Ruutu et al. |
| 2005/0037775 | A1 | 2/2005 | Moglein et al. |
| 2006/0271517 | A1 | 11/2006 | Deloach, Jr. |
| 2007/0004428 | A1 | 1/2007 | Morgan et al. |
| 2007/0121560 | A1 | 5/2007 | Edge |
| 2008/0176583 | A1 | 7/2008 | Brachet et al. |
| 2010/0159958 | A1 | 6/2010 | Naguib et al. |
| 2011/0306357 | A1 | 12/2011 | Alizadeh-Shabdiz et al. |
| 2011/0306360 | A1 | 12/2011 | Alizadeh-Shabdiz et al. |

OTHER PUBLICATIONS

Battiti, Roberto et. al., "Optimal Wireless Access Point Placement for Location-Dependent Services", Dept. of Information & Comm. Tech., University of Trento, Technical Report # DIT-03-052, Oct. 2003, p. 1-14.

Bowen III, et. al., "Combining Position Estimates to Enhance User Localization," WPMC, Sep. 17-20, 2006, p. 1-5.

Jin, Ming-Hui et al., "802.11-based Positioning System for Context Aware Applications" GLOBECOM, IEEE 2003, 2003, pp. 1-5.

Komar, Can, et al., "Location Tracking and Location Based Service Using IEEE 802.11 WLAN Infrastructure," European Wireless 2004, Barcelona Spain, Feb. 24-27, 2004, pp. 1-7.

Ladd, Andrew et. al., "Use Wireless Ethernet for Localization," Ladd et. al., IEEE/RSJ International Conference on Intelligent Robots and Systems (IROS'02), Lausanne, Switzerland, Oct. 2002, p. 1-6.

Lorinez, Konrad et al., "MoteTrack: A Robust, Decentralized Approach to RFBased Location Tracking" LoCA 2005, LNCS 3479, May 2005, pp. 63-82.

Rehim et. al., "The Horus WLAN Location Determination System," In Communications Networks & Distributed Systems Modeling & Simulation Conference, Jun. 2005, p. 1-14.

Roos, Teemu et. al., "A Probabilistic Approach to WLAN User Location Estimation," Intl. J. of Wireless Information Networks, vol. 9, No. 3, Jul. 2002, p. 1-10.

Stoleru, Radu et. al., "Probability Grid: A Location Estimation Scheme for Wireless Sensor Networks," 2004 IEEE Comm. Society Conference, Oct. 4-7, 2004, p. 1-10.

METHODS AND SYSTEMS OF ASSIGNING ESTIMATED POSITIONS AND ATTRIBUTES TO WIRELESS ACCESS POINTS IN A POSITIONING SYSTEM

CROSS-REFERENCE TO RELATED APPLICATIONS

This application claims the benefit under 35 U.S.C. §119 (e) to U.S. Provisional Patent Application No. 61/614,675, entitled Methods and Systems of Assigning Estimated Positions and Attributes to Wireless Access Points In A Positioning System, filed on Mar. 23, 2012, the contents of which are incorporated by reference herein.

BACKGROUND OF THE INVENTION

1. Field of Invention

The invention generally relates to estimating the location and/or other attributes of wireless devices that are used as reference points for positioning other wireless devices, and, more specifically, to the use of spatial and/or temporal discretization when producing location estimates and/or other beacon attributes.

2. Description of Related Art

In recent years, mobile and portable communication and computing devices have become ubiquitous, and wireless communication systems have expanded to meet the corresponding demand for connectivity. Mobile and portable devices have no fixed locations and often accompany their users as they move, and application developers have seized on the opportunity to create applications that update or adapt based on the locations of the mobile devices running the applications. Examples include maps that update to indicate the current position of the device or advertisements that adapt based on proximity to a particular point of interest.

In order to enable location-aware applications, device makers must make their devices capable of acquiring position information with minimal user input. On the regulatory front, the FCC enhanced 911 rules mandate that mobile telephones must be able to supply location information to emergency operators when making 911 calls. One conventional solution to the problem of device positioning is GPS, which uses transmissions from satellites that follow carefully prescribed orbits. Unfortunately, GPS often fails to cover indoor and densely developed urban areas, requires dedicated hardware, and often suffers from slow time to first fix. Thus, more and more positioning systems are based on "beacons of opportunity" such as IEEE 802.11 access points and cellular base stations. They use transmissions from existing wireless communication systems that are received by the standard hardware of the mobile device and combine them with known information about the beacons to determine the position of the mobile device. Such systems effectively complement GPS coverage areas while providing fast time to first fix and requiring no dedicated hardware.

There are currently numerous beacon-based positioning systems both in the research community and in commercial and industrial deployments, and they can be broadly divided into those that use pattern matching (also known as fingerprinting) and those that use distance estimates to known reference points. Pattern matching positioning technologies as developed by Placelab and others ("Practical Metropolitan-Scale Positioning for GSM Phones", Chen et al.) estimate the position of the client device by matching its observations to a map of received signal values collected in the area.

In contrast, systems that use distance estimates explicitly estimate beacon locations rather than simply mapping the patterns of received signal strength from the beacons. Such systems then estimate the range from the client device to the observed beacons based either on signal propagation time or received signal strength (RSS).

Time-based systems use measurements of the time between transmission and reception of a signal to estimate the distance between the transmitter and the receiver. Such systems employ time of arrival (TOA) or time-difference of arrival (TDOA) schemes to generate range estimates for use in a variety of algorithms to generate position estimates for the user (U.S. RE38,808, Schuchman, et al; US 2002/007715 A1, Ruutu, et al). However, in asynchronous systems such as GSM and UMTS, additional equipment is often installed at each cell at significant additional cost (U.S. Pat. No. 6,275,705 B1, Drane, et al; U.S. Pat. No. 6,526,039 B1, Dahlman, et al.; U.S. Pat. No. 6,901,264 B2, Myr).

Systems that use received signal strength (RSS) to estimate the distance from the mobile to the transmitting beacon use the fact that RSS is strongly related to the distance from the transmitter to the receiver ("Indoor/Outdoor Location of Cellular Handsets Based on Received Signal Strength" by Zhu and Durgin). Well-known pathloss models show that signal power falls exponentially with distance, so knowledge of the pathloss exponent and other parameters such as antenna gain and transmit power allows the positioning system to compute range estimates. Several well-known beacon-based positioning systems use this approach, notably in the form of wi-fi positioning (WPS) based on IEEE 802.11 access points.

BRIEF SUMMARY OF THE INVENTION

Under one aspect of the invention, methods of and systems for assigning estimated positions and attributes to wireless access points in a positioning system are disclosed.

Under another aspect of the invention, a method of estimating a characteristic of a wireless beacon includes receiving a set of data points. Each data point contains information about characteristics of a wireless beacon. The method also includes dividing at least one dimension into a set of regions in which each region of the set has region boundaries that do not overlap with other regions. The method further includes associating each data point with one corresponding region based on at least one element of the information of the data point lying within the boundaries of the corresponding region and determining an aggregate characteristic for each region based on the information of the data points associated with the corresponding region. The method estimates a characteristic of the wireless beacon based on at least one aggregate characteristic.

Under yet another aspect of the invention, the at least one dimension is a spatial dimension and the element of the information of the data point is an estimated location at which radio signals from the wireless beacon were detected.

Under a further aspect of the invention, the aggregate characteristics for each region is an aggregate location.

Under still another aspect of the invention, the estimated characteristics of the wireless beacon is an estimated geographic location of the wireless beacon.

Under an aspect of the invention, the at least one dimension being a temporal dimension and the element of the information of the data point is an estimated time at which radio signals from the wireless beacon were detected.

Under still a further aspect of the invention, the aggregate characteristic for each region is a count of a number of distinct estimated locations at which radio signals from the wireless beacon were detected in which each distinct estimated location is spaced apart from at least one other distinct estimated location by more than a threshold distance.

Under another aspect of the invention, the estimated characteristic of the wireless beacon is a measure of the suitability of the wireless beacon for use as a reference point in a wireless position estimation technique.

Under yet another aspect of the invention, the information contained by the data points include an estimated location at which radio signals from the wireless beacon were detected, an estimated time at which radio signals from the wireless beacon were detected, and a measure of a strength of radio signals received from the wireless beacon.

Under a further aspect of the invention, the aggregate characteristic includes a result from at least one of a maximum value, a minimum value, a mean value, a median value, a mode value, a cardinality value, a percentile value, a confidence interval value, a variance value, a standard deviation value, and a probability value.

Under an aspect of the invention, a system performs the techniques recited above and below.

Any of the above-recited aspects can be combined with any of the other recited aspects and any embodiments or implementations set forth herein.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
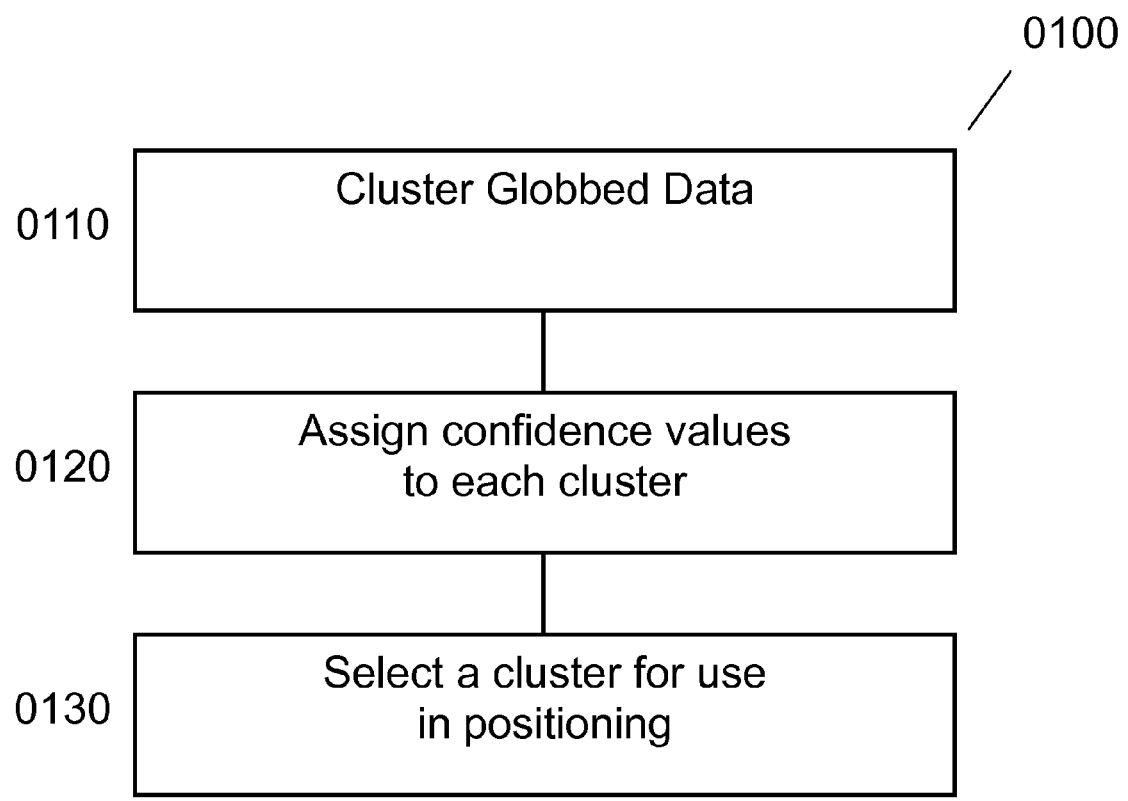
FIG. 1 illustrates a method of coarse positioning.

Embodiments relate to the use of wireless communication devices, such as IEEE 802.11 access points, as reference points for estimating the positions of client devices such as cellular telephones, notebook computers, tablet computers, gaming systems, and other wireless-enabled devices. The word beacon is used in this document to refer to wireless communication devices that are used as reference points for positioning. Such a positioning system requires the creation and maintenance of a database of beacon attributes.

In certain embodiments, attributes reflect the likelihood that beacon location information recorded in the database reflects the true present location of the beacon. In extreme cases, a beacon may be considered pathological if it exhibits behaviors that make it unsuitable for use in the positioning system. In other embodiments, attributes include quality factors that aid in the estimation of client device positions by characterizing the beacons used in the position estimation function. Still other embodiments contain methods and systems for estimating beacon locations.

In particular, some embodiments feature the use of spatial and/or temporal discretization when producing location estimates or other beacon attributes. Spatio-temporal discretization and accumulation, also referred to as globbing, can prove useful both as means for constructing statistics based on aggregated samples and for saving computation by accumulating large sets of samples into smaller sets of aggregated sample units or globs. Discretization can include any techniques in which one or more areas of space and/or time are defined to be discrete units. A simple example of a spatial discretization scheme is a regular grid in which each square forms a discrete unit. In such a system, samples collected within the same grid square could be interpreted as coming from a single discrete location, and their individual attributes could be accumulated into aggregate attributes associated with the discrete location.

Observables and Attributes

Certain embodiments characterize beacons either through direct submissions or scans (generally called data points herein). Direct submissions involve the manual collection of beacon identification and location information. Scans use signals received from the beacon to record where, when, and at what power level the beacon was observed. Scans can further be divided into those collected by client devices and those collected systematically by specialized scanning devices. Finally, by accumulating a set of scans, the beacon database can be populated with attributes characterizing the expected behavior of each beacon and the stability or likelihood that each beacon will continue to conform to its expected behavior.

Submissions

Submissions, as used herein, describe the sharing of beacon information that has been collected or cataloged without using a scanning device. Submissions often come from users or institutions interested in improving the performance of the wireless positioning system in their home, office, or campus, and they can be used to refine and augment scan records. Submissions may contain any or all of the following attributes: beacon identifier, beacon type, co-located beacons, beacon operator, beacon location, submission time, submission source, submission quality, and miscellaneous beacon hardware and software information.

Beacon identifiers include information such as MAC addresses of 802.11 access points or the cell IDs of cellular base stations. In general, beacon identifiers can be used to distinguish between multiple beacons of the same type. Beacon type includes information related to the standards or protocols under which the beacon operates, e.g. IEEE 802.11 (Wi-Fi) or 802.16 (WiMax), Bluetooth, GSM, etc. Co-located beacons are the identifiers of other beacons that are either housed within the same hardware or installed in the same location as the beacon whose information is being submitted.

The beacon operator is the individual or entity that owns or operates the beacon, not necessarily the same individual or entity that generated the submission. For instance, the operator could be a telecommunications company that operates a network of Wi-Fi hotspots, and the submission might come from a bookstore that has one of the hotspots installed.

Beacon location information can take many forms including coordinates such as latitude, longitude, and altitude. Alternatively or in addition, beacon location can be described by metropolitan or regional identifiers such as street address, building, floor, room, city, county, state, zip code, region, or country. Finally, beacon location can be described based on physical characteristics of the land, water, and buildings in the area.

Submission time and source describe when the submission occurred and the individual or entity responsible for the submission. The submission quality relates to the accuracy and trustworthiness of the submission source. For instance, a coffee shop might submit the locations of their Wi-Fi access points with a location accurate to within 10 meters whereas a university might submit locations accurate to 1 meter. In that case, the university submissions would be deemed to have a higher submission quality.

Other possible submission information includes the manufacturer and model of the beacon, hardware and software configurations, installation details, and the beacon operator. Hardware configurations can include information related to antennas, radios and amplifiers. Software (including firmware) configurations can include channel or frequency settings, encryption, power control algorithms, and other modes or capabilities. Installation details can include information related to the position and orientation of the beacon as well as whether the beacon is indoor or outdoor, the orientation of directional antennas, and whether the installation is temporary or permanent or fixed or mobile. For instance, a submission of a UMTS beacon could include the azimuth, antenna pattern, altitude, and downtilt of the sectorized antennas.

Scans

Scans record the characteristics of signals, (e.g., received signal strength, time of transmission, time of reception) received from beacons, along with any available side information about the circumstances under which the data was collected. In particular, while it is typically desirable to collect as much information as possible with each scan, scans may or may not include information about the location at which the scan was performed. Dedicated scanning devices or client devices may perform scans. For example, an organization may deploy a dedicated scanning device for the express purpose of generating beacon records, whereas a user operating a client device may collect scan data as a byproduct of normal use (e.g., voice conversation, navigation, games, internet communication). While users may decide to purposely contribute scan data to the generation of a beacon database, the distinction lies in the primary function of the scanning device rather than the intent of the individual operating the scanner.

Scans may include any or all of the following attributes: beacon identifiers, beacon type, scan location information, received signal characteristics, scan time and date, and scanning device information. Beacon identifiers can include both unique identifiers and non-unique identifiers. Unique identifiers are often mandated by standards in order to allow the coexistence of multiple beacons. For instance, MAC addresses in 802.11 and Cell Global Identification (CGI) in GSM are both required to be globally unique identifiers by their respective standards. Non-unique identifiers can include user-configurable names such as SSID in 802.11.

Beacon type includes information related to the standards or protocols under which the beacon operates, e.g. IEEE 802.11 (Wi-Fi) or 802.16 (WiMax), Bluetooth, GSM, UMTS etc.

Scan location information can include estimated scanner location, estimation accuracy, scanner location source, and other location related to the position of the scanner at the time of the scan. The estimated scanner location can be expressed in coordinates such as latitude, longitude, and altitude, and it may also include velocity information. The estimation accuracy expresses the expected error in the estimate of the scan location. For instance, the accuracy of estimated position provided by a GPS system is often characterized as a function of the number, orientations, and signal strengths of the satellites used for positioning.

The scanner location source contains information related to the systems and methods used to estimate the location of the scanner during the collection of the scan. For instance, scanner location may be provided by GPS or by the manual entry of coordinates by an individual operating the scanning device. In addition, the estimated scanner location may be generated by the same positioning system that will in turn use the scan to update its beacon database. In any case, the scanner location source can contain detailed records of the identities and signal characteristics of any reference points used to generate the position estimate. Those records can then be used to describe the quality of the scanner location estimate or the quality of the reference points used to derive the location.

For instance, if the scanner was positioned based on Wi-Fi access points, the identities of those access points provide information about the quality of the estimated scanner location as well as the quality of the estimated positions of the access points themselves.

Other location information can include local identifiers and physical characteristics. Local identifiers can include components of the civic address such as street address, building, floor, room, city, county, state, zip code, region, or country. Physical characteristics include information related to the land, water, and buildings in the area as well as information such as whether the scan was collected indoors or outdoors.

Received signal characteristics include information related to the beacon transmissions that were received by the scanning device. They can include received signal strength (RSS), channel or frequency of the signal, and the noise level at the scanner.

Scanning device information can include scanner identifiers, scanner type, manufacturer and model information, and software and hardware configurations. Scanner identifiers may or may not be globally unique. Scanner types may include both dedicated scanning devices, used expressly for the purpose of creating a database of beacons, and client devices, non-dedicated devices that collect scans intentionally or as a byproduct of other activities. Software and hardware configurations may include model numbers, operating systems, and specific applications that caused a scan to be initiated. For instance, a scan could be initiated by a turn-by-turn mapping application or a local search application.

Glob Attributes

Recalling that a glob is an aggregation of data points that lie within a defined area of space and/or time, the attributes of a glob are derived from information about its definition and its constituent data. While it is not essential that glob attributes be stored in a database, doing so may improve processing efficiency in some implementations by saving resources during the repeated computation of glob or beacon attributes. Globs can possess any of the attributes of their constituent scan or submission data, and they may further possess attributes derived from the statistics of their constituent data points.

Attributes associated with glob definition can include the spatial and temporal boundaries used to define the glob. Such attributes can further include a point or set of points in space and/or time with which the glob is associated. For instance, a spatial glob may be represented by the point in the middle of the defined area of the glob. As another example, a glob can be represented by an arbitrary data point located within the glob. Assigning a single point to be the location for a glob can facilitate the computation of distances between globs or between globs and points and the accumulation of globs into clusters.

In reference to globs and in general throughout this work, the term statistics can be taken to include functions such as maximum, minimum, mean, median, mode, cardinality (number of elements in a set), percentiles, confidence intervals, variance, standard deviation, or probability of satisfying some condition. Regarding globs in particular, many useful statistics can be derived from the attributes of data points aggregated into the same glob. As one example, glob attributes may include the mean and standard deviation of the received signal strength values for the set of scans in a glob. As another example, glob attributes may include the 95 percent confidence interval on the temporal frequency of scan data collection within the glob.

Beacon Attributes

By collecting relevant scans and submissions either as individuals or in discretized units, certain embodiments generate a series of attributes for each beacon in the database. Attributes can be used to diagnose pathologies and quantify beacon utility, and beacon attributes can also serve important roles in positioning client devices. After attributes have been determined for a beacon, they can be stored and fed back into the positioning system in order to further refine attributes of other beacons in the system. In addition, as relevant information accumulates over time, beacon attributes may change, and the historical record of attribute evolution can itself be an attribute of the beacon.

Beacon attributes may include one or more versions of any or all of the following parameters: identifiers, position information, quality factors, confidence factors, pathology factors, observation information, and beacon features.

Beacon identifiers can include both unique identifiers and non-unique identifiers. Unique identifiers are often mandated by standards in order to allow the coexistence of multiple beacons. For instance, MAC addresses in 802.11 and Cell Global Identification (CGI) in GSM are both required to be globally unique identifiers by their respective standards. Non-unique identifiers can include user-configurable names such as SSID in 802.11.

Beacon position information can include estimated beacon location, estimation accuracy, and other information related to the scans or submissions used to estimate the position of the beacon. The estimated beacon location may be expressed in coordinates such as latitude, longitude, and altitude. However, particularly in light of the utility of spatial discretization, it is essential to realize that there are innumerable alternative representations of position beyond latitude, longitude, and altitude. The estimation accuracy expresses the expected error in the estimate of the beacon location, which may be a function of the number and attributes of scans and submissions used to estimate the beacon position.

Other beacon location information can include local identifiers and physical characteristics. Local identifiers can include components of the civic address such as street address, building, floor, room, city, county, state, zip code, region, or country. Physical characteristics include information related to the land, water, and buildings in the area as well as information such as whether the beacon is believed to be indoors or outdoors.

Beacon quality factors include attributes related to the precision of the beacon's estimated location and the utility of the beacon in estimating the positions of client devices. Quality factors can include functions of the attributes of the scans or submissions containing information about the beacon. Some quality factors may be functions of the number, spatial distribution, or signal characteristics of scans used to position the beacon. For example, estimated coverage areas or pathloss exponents can express the utility of the beacon for client positioning, and scan count and spatial standard deviation can express the precision of the beacon's estimated location.

Beacon confidence factors express the likelihood that a beacon has been incorrectly positioned due to relocation or spurious scan or submission information. Pathology factors contain information related to the likelihood that the beacon will exhibit one or more pathological behaviors. Both confidence and pathology factors can include functions of the attributes of the scans or submissions containing information about the beacon.

Observation information relates to the times, places, frequency, and probability with which the beacon was scanned and can include age, quiet time, duration, number of observations, observation types, observation frequency, and coverage area. The age of a beacon is defined as the length of time since the first observation of the beacon, and the quiet time is the length of time since the last observation of the beacon. The duration is the length of time between the first and last observations of the beacon, number of observations is the total number of scans in which the beacon has appeared. Observation types relate to the attributes of the scans or submissions relevant to the beacon.

Observation frequency describes the temporal distribution of observations. It can take the form of a simple average (total observations divided by total duration), a piecewise average (observations during a certain interval divided by the length of that interval), or more advanced statistics related to the precise temporal distribution of observations.

Observation probability (or observability) relates to the fraction of scans from within a given spatio-temporal area that include the beacon in question. For instance, given a circle of radius 100 meters and a time window of one day, a beacon might be observed in 10 out of 20 scans for an empirical observation probability of 0.5. In addition, observability can encompass more advanced functions of the empirical observation probability such as confidence intervals or spatial probability density functions.

Coverage area is the spatial equivalent of observation frequency in that it describes, with some degree of granularity, the spatial distribution of observations. For instance, coverage area can be the radius of the smallest circle that contains observations of the beacon, a set of disjoint rectangles of a certain size that contain the observations, or more advanced statistics related to the precise spatial distribution of the observations.

Beacon features can include information such as the manufacturer and model of the beacon, hardware and software configurations, installation details, and the beacon operator—all of which can be derived from scans or submissions or both. Hardware configurations can include information related to antennas, radios and amplifiers. Software (including firmware) configurations can include channel or frequency settings, encryption, power control algorithms, and other modes or capabilities. Installation details can include information related to the position and orientation of the beacon as well as whether the beacon is indoor or outdoor, the orientation of directional antennas, and whether the installation is temporary or permanent or fixed or mobile. Finally, beacon features can include the identities of any other beacons that are either housed in the same hardware or installed in the same location (co-located beacons).

General Beacon Positioning

Conceptually, there are several different problems addressed by the beacon positioning techniques disclosed herein. While the conceptual framework outlined here does not dictate an architecture or a logical division of functions, it is a helpful device for understanding the associated issues and introducing the terminology in the remainder of this document. In general, while there is some mild hierarchy between the different conceptual units, the functions can be performed in many different combinations and configurations. In addition, some implementations may be able to omit certain functions, and other implementations may add functional units above and beyond those mentioned here.

One problem is the identification of pathological beacons whose features or behaviors make them unsuitable for treatment as typical beacons in a positioning system. One example of a pathological beacon is a Cell-on-Wheels (COW) that is frequently moved between special event locations such as sports arenas. Specific pathology definitions and examples are provided in a subsequent section. Another example is an 802.11 access point whose MAC address (theoretically a globally unique identifier) is shared by another 802.11 access point, giving the appearance that the access point exists in more than one location simultaneously.

A second problem is the grouping of data points into disjoint subsets. That is, scan or submission data that contradicts other scan or submission data must be grouped such that each subset contains only compatible data points—data points that are believed to correspond to a single beacon placement. As one example, data points collected from different cities could be considered to correspond to more than one beacon placement if the beacon's transmission range was much less than the separation between the cities. As another example, data points collected from a single location at times more than one year apart could be considered to correspond to more than one beacon placement if the time separation indicated that the beacon had been displaced and replaced between the collection of the two data points. Such grouping can often be accomplished through the use of a clustering algorithm, so we refer to the general practice of grouping data points into subsets as clustering.

A third problem is the selection of one or more clusters as representing the current true location of the beacon. The cluster selection process is referred to as coarse positioning because it represents the selection of a relatively large region that the beacon is believed to occupy. Coarse positioning is essential for repositioning beacons that have been relocated as well as avoiding errors caused by spurious data points located far from the beacon's current true position.

A fourth problem is the actual estimation of a beacon's location, referred to as fine positioning. Given a set of reference points, fine positioning combines the locations of the reference points with attributes of the reference points indicating their proximity to the beacon and indicators of the quality of their information.

A fifth problem is the measurement of the quality of the decisions and estimates generated during pathology detection, clustering, coarse positioning, and fine positioning. For instance, it is often desirable to maintain confidence values derived during the coarse positioning process in order to assess the quality of a beacon's coarse location information. As another example, it is desirable to retain knowledge of the precision of the beacon position estimate determined during fine positioning so that the beacon can be treated accordingly during client positioning.

Beacon Pathology Overview

In simple terms, certain embodiments declare that a beacon is stable if it can only be observed within a single coverage area, where the allowable size of a coverage area depends on the details of the standards by which the beacon is governed. For the example of Wi-Fi (IEEE 802.11) access points, a reasonable coverage area would have a radius of several hundred meters. Hereafter, we consider the term stable to mean non-pathological, and metrics related to beacon stability reflect the likelihood or degree to which a beacon exhibits one or more pathologies.

There are several mechanisms through which a beacon can be rendered unstable, meaning that it can be or has been observed in multiple distinct coverage areas. Broadly, certain embodiments divide the pathologies into the following categories: mobility, ubiquity, and excess range. Each of the pathologies is defined below.

Mobility

Certain embodiments declare beacons to be mobile if they transmit while being carried with a user or transported in a vehicle. Mobile beacons often appear in a large number of locations in quick succession, so they can degrade user-positioning performance over large areas and for large numbers of users.

Mobile beacons fall into the following categories: vehicular, personal, and asset.

Vehicular beacons are further subdivided into transit, professional, and individual vehicular beacons. Transit beacons are permanently or semi-permanently installed in buses, trains, boats, planes, or other vehicles that follow predictable routes.

Professional vehicular beacons are installed in commercial or industrial vehicles. For instance, beacons installed in limousines, taxis, delivery trucks or other vehicles that follow unpredictable routes would be considered professional vehicular beacons. Individual vehicular beacons are permanently or semi-permanently installed in automobiles, vans, trucks, or other personal vehicles that do not adhere to any predictable routes.

Personal beacons are divided into portable and ad-hoc types. Portable beacons are dedicated beacon devices that are carried by individuals, and, though they may be used in vehicles, are not permanently installed in any vehicle. Such devices are often referred to as Personal Hotspots or Mobile Routers. Ad-hoc personal beacons are client devices such as notebook computers or cellular telephones that are capable of acting as beacons under certain configurations. One popular application of ad-hoc beacons is to "tether" a mobile telephone to another client device using Wi-Fi or Bluetooth in order to give the second device access to the cellular data network. In this example, the mobile telephone acts as the ad-hoc beacon.

Asset beacons are beacons that are installed in or transported with goods or other cargo. For instance, palletized cargo or shipping containers can contain beacons for use in inventory and tracking.

Ubiquity

Certain embodiments declare beacons to be ubiquitous if they have identifiers that are duplicated by other beacons and/or possess other attributes that render them difficult or impossible to distinguish from one another. That is, whereas non-ubiquitous beacons have globally unique identifiers, ubiquitous beacons do not have any globally unique identifiers. The result is that a ubiquitous beacon can appear to be in multiple locations at the same time. Ubiquity is distinct from relocation and mobility because it does not require that a beacon be physically moved from one location to another, and Ubiquity is exhibited by an ensemble of beacons rather than a single pathological beacon.

Ubiquitous beacons fall into the following categories: factory duplicated, reprogrammed, and dynamic. Factory duplicated beacons are devices whose manufacturer has intentionally or inadvertently given the same identifier to multiple devices. Reprogrammed beacons are devices that have been reprogrammed to intentionally or unintentionally duplicate the identifiers of other devices. Dynamic beacons are devices whose identifiers change over long or short time scales and intentionally or unintentionally duplicate the identifiers of other devices. Dynamic ubiquitous beacons are particularly common in some enterprise Wi-Fi deployments in which identifiers are assigned by a central controller and passed from beacon to beacon in order to give the appearance of seamless connectivity to the client device.

Excess Range

Certain embodiments declare a beacon to have Excess Range if it is observable over an area that significantly exceeds the coverage areas of typical beacons of the same type. For example, a typical 802.11 beacon has a coverage radius on the order of 100 meters. An 802.11 beacon with Excess Range could have a coverage radius on the order of 1000 meters. Like Ubiquity, Excess Range does not require that the pathological beacon be moved from one place to another, but unlike Ubiquity, Excess Range is a property of a single beacon and is based entirely on the physical characteristics of the beacon and its environment.

Certain embodiments declare a beacon to have Excess Range in response to a number of mechanisms including device configurations and environmental factors. Features such as nonstandard hardware (e.g., high gain directional antennas) and firmware/software (e.g., selecting unusually high transmit power) often lead to Excess Range. Similarly, beacons installed at high altitude or near large open areas can often be detected at ranges that exceed typical transmission distances.

Beacons exhibiting Excess Range fall into the following categories: environmental, configuration, and network.

Environmental Excess Range beacons include those installed or placed on a natural (e.g., mountain) or man-made structure (e.g., tower) that affords an unobstructed path to distant locations by virtue of its height. Other mechanisms for environmental Excess Range include planar effects such as water bounce and waveguides. Water bounce is a phenomenon in which signals from a beacon are strongly reflected by the surface of a body of water. Waveguide effects arise from parallel reflecting surfaces such as tunnels or "Urban Canyons" formed by tall buildings on either side of a street. Waveguides have the effect of focusing signal energy along the axis of the waveguide and extending the effective range of the signal.

Configuration-based Excess Range beacons are detected at unusually large distances due to special hardware or software. Such configurations can be as simple as setting the maximum transmit power used by the beacon to an unusually high level. Excess range can also arise from antenna choices. Directional antennas (e.g., parabolic dishes) achieve increased range in one or more directions by narrowing the pattern of the signal in azimuth and/or elevation. High-gain omnidirectional antennas achieve increased range in a particular plane by narrowing the signal pattern in elevation.

Network-based Excess Range beacons use multiple transmitting devices to extend transmission range. Relay devices such as range extenders receive beacon signals and then rebroadcast them, essentially re-amplifying the signals so that they can be received at distances beyond the reception range of the original signals. Mesh networks consist of networks of cooperating beacons in which transmissions may travel through the air between beacons over multiple hops and may give the appearance of Excess Range for one or more beacons in the network.

General Clustering

One of ordinary skill in the art will be familiar with the term clustering as representing a wide array of techniques for grouping a set of data points into one or more subsets. Clustering algorithms are often based on one or more distance metrics, and members of a given cluster are often grouped together in order to optimize some function of the associated distance metrics. For instance, Lloyd's algorithm for performing k-means clustering iteratively minimizes the sum of the Euclidean distances from each data point to its corresponding cluster center. As another example, connected graph clustering forms clusters such that no two members of different clusters are separated by less than a given threshold distance.

While two-dimensional spatial clustering provides for straightforward visualization, it is important to realize that clustering works equally well in higher dimensional or non-spatial coordinate systems. Specifically, when data points possess both spatial location and an associated point in time, they can be clustered in space, time, or both.

General Quantization

In the fields of signal processing and data analysis, it is often advantageous to transform data that naturally takes continuous values into corresponding data which takes discrete values. Certain embodiments take continuous-valued location and/or time information and map it to a space of discrete areas and/or time intervals. This mapping necessarily causes a loss of precision or quantization error in the data, but the quantization error is manageable so long as it is not the dominant source of error. For instance, if a set of location data were discretized into squares of size 2 meters by 2 meters, the worst case quantization error would be $\sqrt{2}$ meters. Thus, if the expected squared error of the underlying location information were greater than 2 meters, the quantization error would be considered insignificant. The principle is that any distinction between the locations of scans that fall within a single square is rendered meaningless by the error in the original location information. Therefore, we can consider scans falling within a single square to be collected from a single location.

There are several advantages associated with using data which has been quantized. First and foremost, computing hardware is typically unable to process data which takes continuous values, so discretization allows processing functions to be implemented on computer hardware. Secondly, reducing the precision of numerical values reduces the number of bits needed to store those values. Third, algorithms that depend on the location data can be significantly more efficient if the number of discrete locations is significantly smaller than the number of original data points. For instance, computing the pairwise distances between a set of N data points requires $O(N^2)$ computations. However, if the N data points are grouped into M<<N discrete units, then the computational load is significantly reduced by computing only the pairwise distances between the M discrete units.

Other advantages of spatial discretization which will be familiar to one of ordinary skill in the art include the fact that globbing functions as a crude whitening filter. That is, data points which come from effectively indistinguishable locations are assumed to contain highly correlated information, and sampling theory indicates that a set of correlated samples is less informative than an identically distributed set of an equal number of uncorrelated samples. In the degenerate case in which two or more samples are related deterministically, they provide only one sample worth of information and should be associated and treated as a single sample, and accumulation and discretization provide a simple method to mitigate sample duplication.

Pathology Detection

We define pathology detection as the process of determining whether a given beacon exhibits one or more of the pathologies defined earlier. In general, pathology detection requires the generation of a model for typical beacon behavior that characterizes one or more observable quantities. Then the pathology detection system is tasked with identifying pathological beacons by comparing the one or more observables to typical values.

The process of characterizing and observing beacon behavior is often greatly simplified by discretizing and aggregating reference points. In the example embodiments that follow, there are several illustrative examples of how reference point aggregation can enable efficient and effective pathology detection, and the embodiments further provide example attributes, parameters for appropriate values of resolution, and thresholds for different applications. Of particular note is the use of quality metrics to determine whether observations of atypical beacon behavior are due to a beacon pathology or aberrant reference point data.

Coarse Positioning

FIG. 1 illustrates a method of coarse positioning 0100. Method 0100 includes clustering globbed data 0110 according to the methods disclosed herein. Optionally, coarse positioning decisions are enabled by finding cluster confidence values 0120 that reflect the likelihood that a given cluster represents a true and stable position for the beacon in question. A single cluster of reference points for use in beacon positioning is selected 0130.

In some embodiments, cluster confidence values are based on decoupled functions indicating cluster validity and cluster currency. Hereafter, we consider validity and currency functions to be subsets of the greater class of confidence functions either individually or in combination. Thus, either a currency function or a validity function may be referred to as a confidence function, and any combination of the two would also be a confidence function.

We define a cluster to be valid if it has ever represented the true location of the beacon. For instance, a cluster belonging to a relocated beacon can still be considered valid even if it corresponds to the beacon's previous location. We define a cluster to be current if the conditions leading to data points being located in the cluster persist at the current time either because the beacon is in-fact observable in the cluster or a condition leading to incorrect data point locations continues to give the appearance that the beacon is observable in the cluster.

As one example, the following equation gives a confidence value equal to the probability of the event T that the cluster is correct. The event T is expressed as the situation in which the cluster is both valid, V, and current, C. Finally, the validity and currency of the cluster are further decoupled by decomposing the joint probability into a product of the probability of validity and the product of the marginal probabilities of currency and validity.

$$\text{Prob}(T)=\text{Prob}(V,C)=\text{Prob}(C|V)\text{Prob}(V)=\text{Prob}(C)\text{Prob}(V)$$

Fine Positioning

Figure 2:
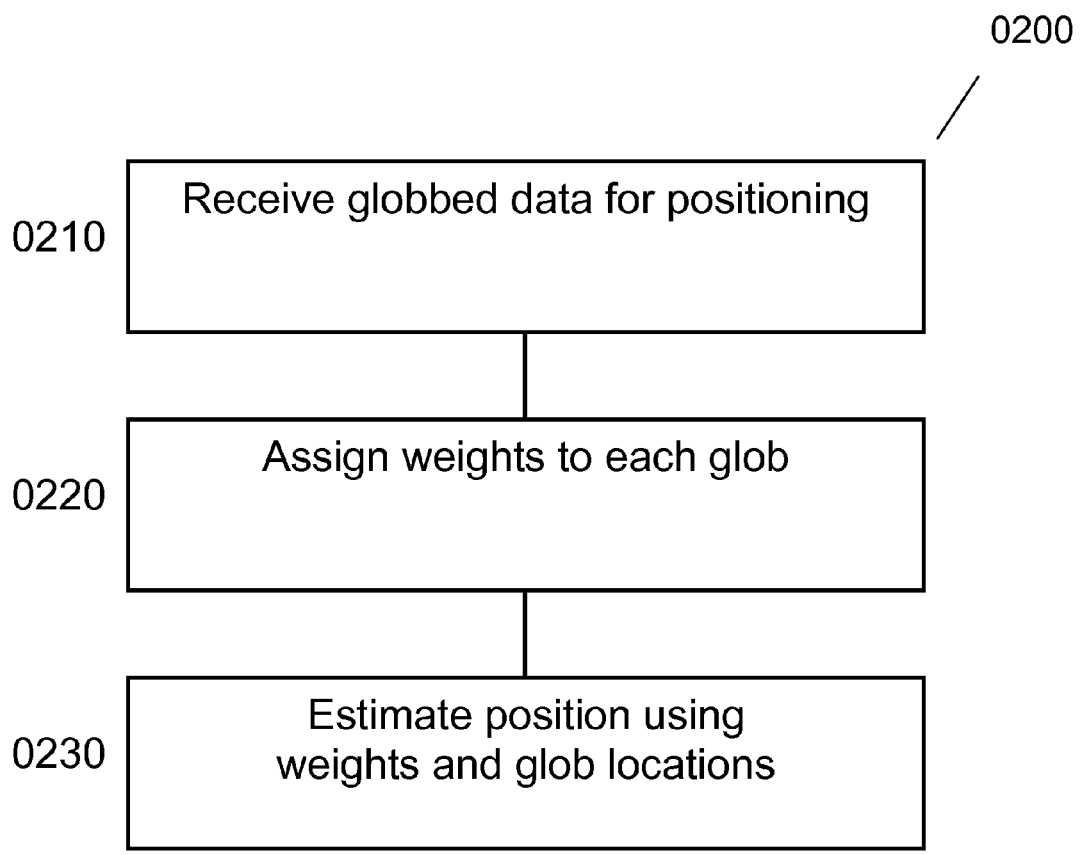
FIG. 2 illustrates a method of determining a fine position estimate of a beacon position.

FIG. 2 illustrates a method 0200 of determining a fine position estimate of a beacon position.

Whereas coarse positioning reduces the set of reference points to be used for positioning by selecting a single cluster, fine positioning produces an explicit estimate of the beacon's position. Method 0200 includes receiving globbed data for position 0210 and assigning weights to each glob 0220.

In some embodiments, the weights can be normalized across all reference points to be used for positioning as follows.

$$r_j = \frac{w_j}{\sum_{i=1}^{N} w_i}$$

In some embodiments, the raw weight values are determined based on estimated distances between the reference points and the beacon being positioned. One of ordinary skill in the art will be familiar with the practice of RSS or TOA-based distance estimation, and the distance estimates may be inversely related to the weight values as follows.

$$w_i = \frac{1}{d_i^2}$$

The estimated position may then be computed 0230 as a weighted sum of a set of reference points locations.

$$lat_{est} = \sum_{i=1}^{N} r_i lat_i$$

$$lon_{est} = \sum_{i=1}^{N} r_i lon_i$$

In some of the examples that follow, novel techniques for distance estimation that leverage reference point aggregation and discretization are introduced, and they can be applied to fine positioning using any number of well-known positioning methods.

Examples

The following illustrative examples demonstrate how the attributes of beacons, scans, and submissions can be used to detect pathologies, resolve cluster conflicts, and estimate beacon locations. Note that the hierarchies and architectures of the different functional blocks that are suggested by the following examples are by no means exhaustive and are meant only to provide plausible and illustrative implementations. Other implementations may reorder, omit, or include additional functional elements while retaining the individual and combined utility of the various elements.

Several of the examples that follow recite various threshold values. In detection or selection systems, thresholds are typically selected to meet performance goals as quantified by two metrics well-known in the art: false alarm probability and miss probability. In the case of pathology detection, the false alarm probability is the likelihood that the detector will mistakenly identify a beacon as pathological when in fact it is not. The miss probability is the likelihood that a pathological beacon will not be identified as pathological. An effective pathology detector should minimize both the false alarm and miss probabilities. However, in most non-trivial applications, it will be impossible to achieve both a false alarm and a miss probability of zero, and adjusting thresholds to decrease one probability will often increase the other. A standard practice is to select the maximum allowable false alarm probability and then adjust thresholds to minimize miss probability while still remaining at or below the maximum false alarm probability. Overall, the selection of threshold values will be an application-dependent design decision and can be performed through theoretical analysis or empirical testing.

Several of the examples that follow recite various constants derived from the analysis of empirical data. One of ordinary skill in the art will be familiar with various techniques for fitting analytical functions to empirical data. For instance, one might derive an analytical relationship between the probability of a beacon exhibiting mobility and the number of discrete spatial units in which the beacon was observed. One way to accomplish this would be to compute an empirical probability of mobility as a function of the number of discrete spatial units in which the beacon was observed and then use linear regression to determine the line that best describes the relationship between mobility and spatial footprint. Naturally, linear regression is only one of the vast set of techniques that exist for the purpose of fitting analytical functions to empirical data, and many times the best function will not be linear.

The choice of fitting function often relies on minimizing a distance metric between the analytical function and the corresponding empirical data. In the case of linear regression, the best linear fit is generally chosen on the basis of minimizing the L2 (Euclidean) distance between the empirical data and the fitting function. However, particularly in situations where the empirical data contains outliers or other anomalies, certain techniques such as Theil-Sen slope estimation offer improved performance by using robust statistics and avoiding some of the weaknesses of conventional distance metrics. In the context of the systems and methods addressed in this work, the best function is often decided on the basis of its impact on client device positioning performance in the context of the full positioning system.

In the examples that follow, we use the terms observation and data point to mean any records of a beacon's presence, proximity, or observability at a given place and time. Scans and submissions are both special cases of observations, and scans and submissions can both be considered to be data points.

Globbing

Figure 3:
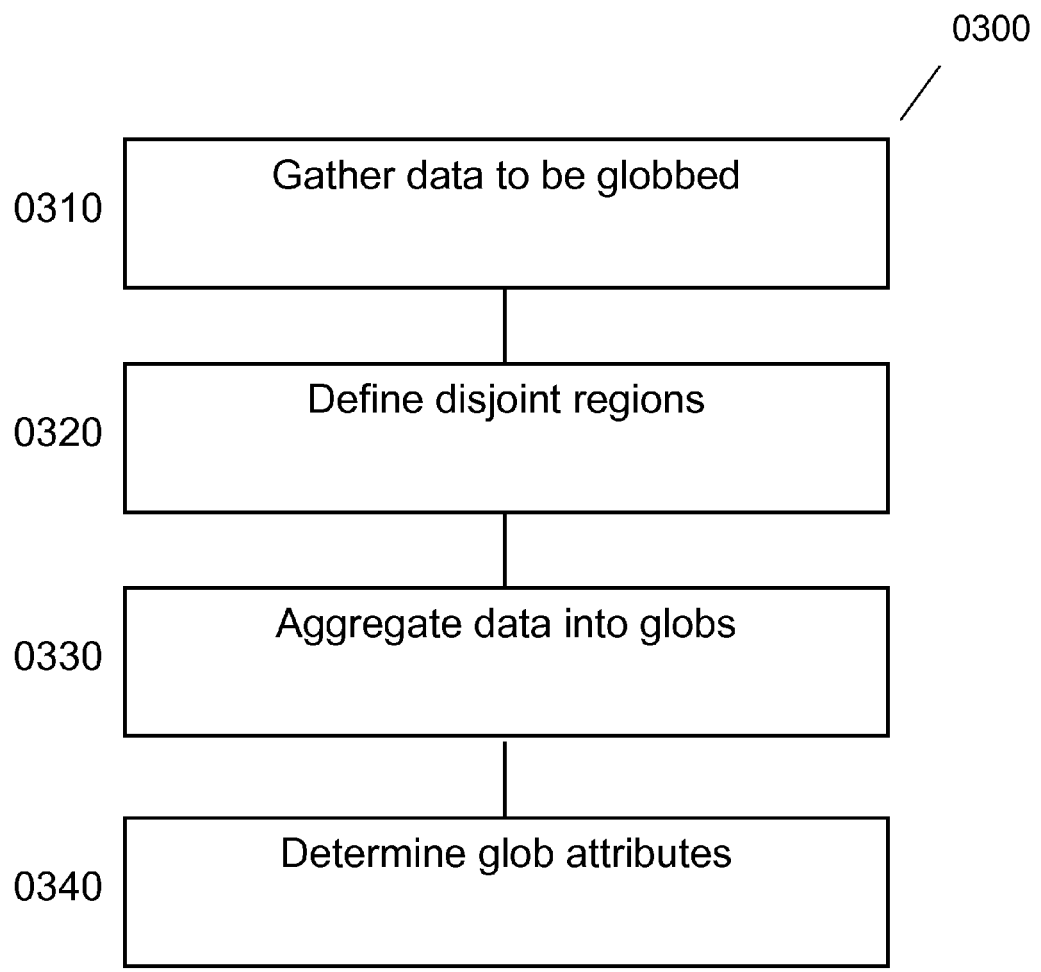
FIG. 3 illustrates a method of aggregating data points into disjoint units known as globs.

FIG. 3 illustrates a method 0300 of aggregating data points into disjoint units known as globs. First, gather a set of data points to be aggregated 0310. As one example, the data set could consist of all scans in which a given beacon was observed. Second, define a set of disjoint regions 0320 in one or more dimensions. For instance, two-dimensional regions could be defined in space by generating a grid of regular squares such that no two squares overlap. While it is often useful to consider sets of regular regions, note that the regions do not necessarily need to be regular. In practice, the definitions of the disjoint regions will depend heavily on the data to be aggregated and the application. Numerous variations will be explained in greater detail in later examples. Third, associate data points with the regions to form globs 0330. As one example, data points whose location information falls within a given disjoint spatial region could be associated with that region to form a glob. Fourth, compute any desired attributes 0340 for the globs as a function of their definitions or their constituent data points. Many example glob attributes and applications will be introduced in examples that follow.

Figure 4:
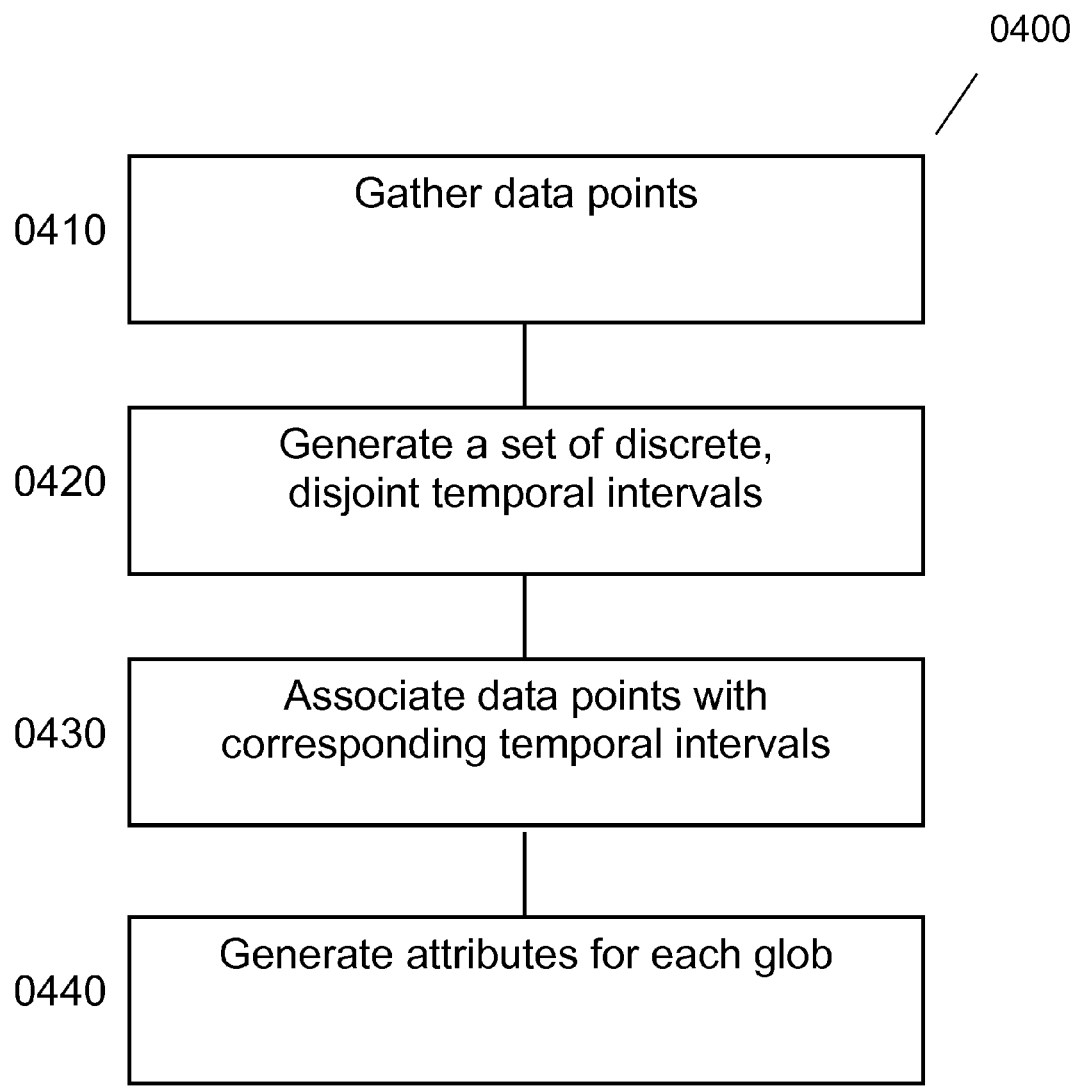
FIG. 4 illustrates a method of defining globs in the time domain.

FIG. 4 illustrates a method 0400 of defining globs in the time domain. First, gather a set of data points to be aggregated 0410. Second, define a set of disjoint temporal regions 0420. As one example, the temporal regions could be regular one hour intervals bounded by integer hours of the day (1 o'clock, 2 o'clock, etc.), though in general the time intervals need not be regular.

In general, the appropriate temporal resolution depends on the application and the data being globbed. As one example, if a non-pathological beacon were defined as being observable from only one distinct location for much longer than one day at a time, then regular globs of length one day would be appropriate to associate data points that were sufficiently simultaneous as to be useful indicators of pathology. Stated another way, if a single 1-day glob contained reliable scans from multiple distinct locations (e.g., locations that are farther apart than a signal range of the beacon), then that would be sufficient to say that the beacon had been observed in multiple distinct locations at substantially the same time, and we could declare it pathological.

Third, associate data points with the regions 0430 to form globs based on their time information and the temporal definitions of the globs. Fourth, compute any desired attributes 0440 for the globs based on their definitions or their constituent data points. As one example of a glob attribute, one could determine the number of observations in each glob as an indicator of times when a beacon is more or less likely to be observed.

Figure 5:
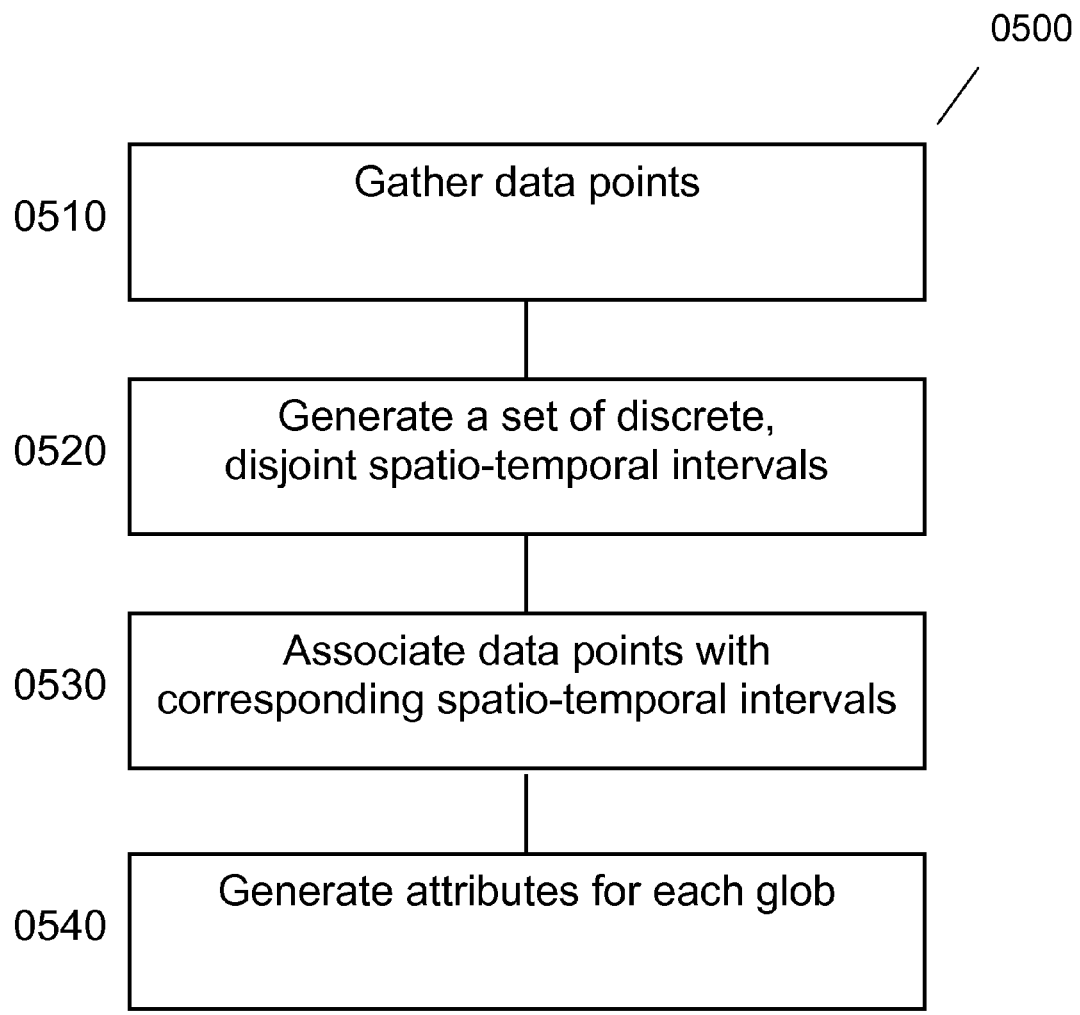
FIG. 5 illustrates a method of defining globs in both space and time.

FIG. 5 illustrates a method 0500 of defining globs in both space and time. First, gather a set of data points to be aggregated 0510. Second, assemble a set of discrete, disjoint units defined in both space and time 0520. For instance, such a set could consist of a regular spatial grid of squares of area 100 square meters (10×10 meters) and regular 1 hour intervals. However, it is not necessary that spatio-temporal globs be uniform in either the spatial or the temporal dimension. In this example, each "square-hour" would form a discrete disjoint unit in space-time such that two units could share the same region in space or they could share the same interval in time, but they would not overlap in both space and time simultaneously. The appropriate spatio-temporal resolution depends on the application and the data set. As one example, if non-pathological beacons were defined to be observable within an area of much less than 1 square kilometer for much longer than one day at a time, then regular globs of 1×1 kilometer and 1 day would form useful indicators of pathology. In this particular pathology detection example, a beacon having two or more globs with the same time interval but different (and non-adjacent) spatial locations would be an indication that the beacon is pathological because they would indicate that the beacon was observed in substantially distinct locations at substantially the same time.

Third, assign the data points to the space-time globs 0530 based on their reported locations and collection times. Fourth, determine any desired glob attributes 0540 as a function of glob definitions and constituent data points.

Figure 6:
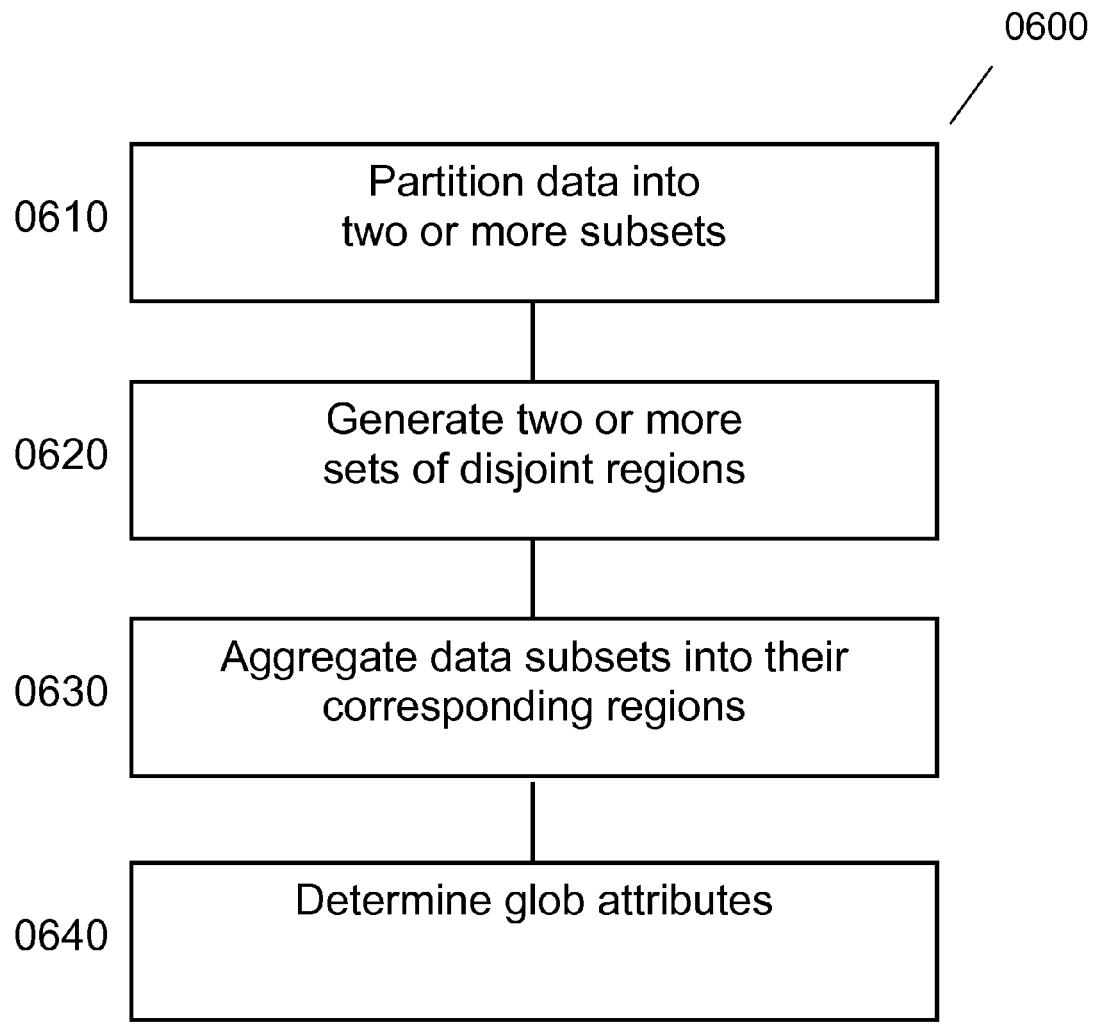
FIG. 6 illustrates a method of using separate sets of globs to aggregate different subsets of data.

FIG. 6 illustrates a method 0600 of using separate sets of globs to aggregate different subsets of data. First, partition the data points into two or more subsets 0610 based on attributes of the data points. As one example, scan data could be separated into subsets based on the type of device (hardware) used to collect the scans or the application (software) that initiated the scans. Second, generate one or more sets of disjoint regions 0620 to define globs. Third, for each subset of the data, assign data points to globs 0630. In this example, the separate sets of globs can overlap or even have identical definitions, but the data points are aggregated such that each set of globs contains only points from one of the subsets of the data points. As one example, two sets of globs could be identically defined according to a regular grid in space, but the sets of globs would remain distinct because each would contain only one type of data points. Fourth, compute any desired attributes 0640 for the globs as a function of their definitions and their constituent data points.

Figure 7:
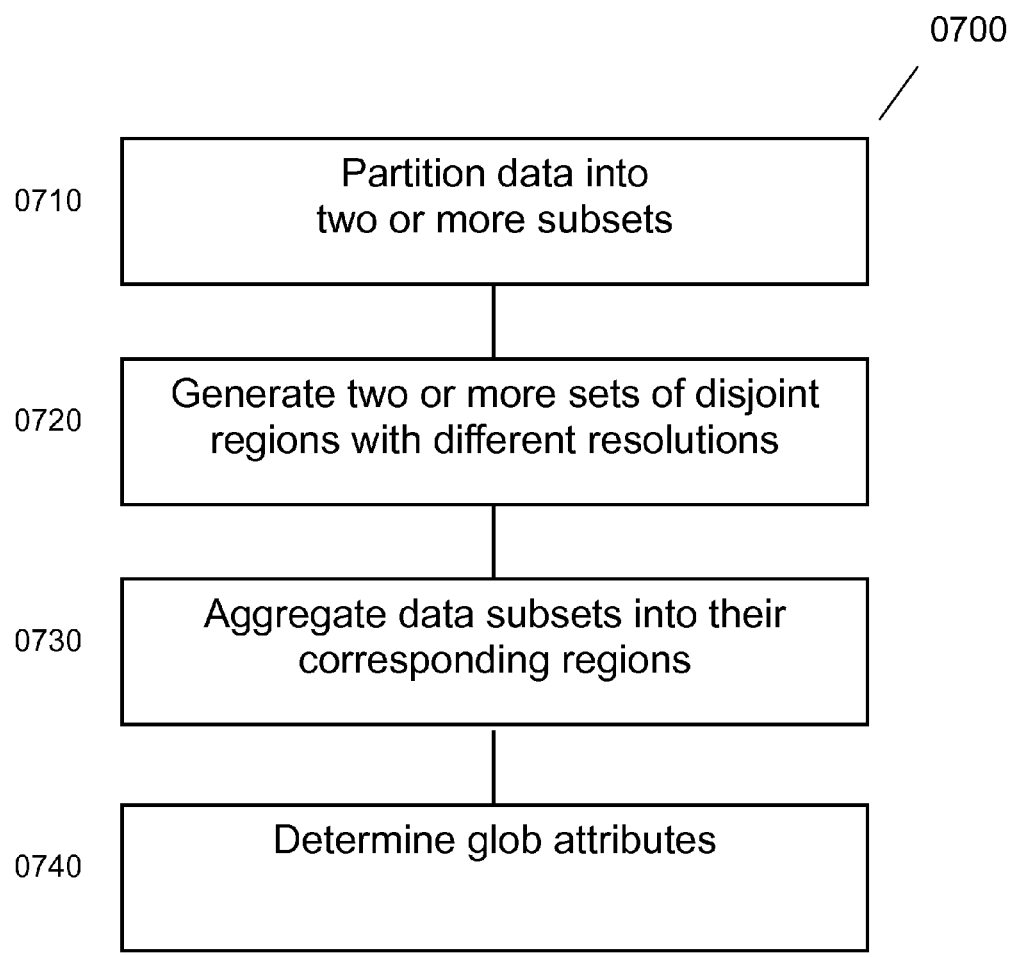
FIG. 7 illustrates a method of assigning different glob resolutions to different subsets of a set of data points based on the attributes of the data points.

FIG. 7 illustrates a method 0700 of assigning different glob resolutions to different subsets of a set of data points based on the attributes of the data points. First, partition the set of data points in to two or more subsets 0710 based on the attributes of the data points. As one example of an attribute used to generate a partition, the data points could be separated according to the source of their associated location information. As another example of an attribute used to generate a partition, the data points could be separated according to the precision of their timestamps. Second, assign each subset to a set of globs 0720 based on the attributes of the subset. Third, aggregate the data points into the chosen set or sets of globs 0730 by using the definition of each individual glob and the attributes of the data points associated with the glob set. As one example of an aggregation scheme, data points could be assigned to globs based on whether or not the location information associated with the data points falls within the spatial regions associated with the globs. Fourth, compute any desired attributes for the globs 0740 as a function of their definitions and their constituent data points.

In a further implementation of the method 0700 described above, some embodiments assign different spatial glob resolutions to different subsets of a set of data points based on the attributes of the data points. First, partition the data points into two or more subsets 0710 based on the attributes of the data points. Second assign each subset of the data points to a set of globs 0720 based on the attributes of the subset. As one example, the data points could be divided into subsets based on the sources of their location information.

Continuing the location source example, the subset of globs could be selected based on the spatial resolution of the glob set and precision of the location source of the associated data point subset. As one example, a first location source could have an root-mean-square (RMS) error of 10 meters, and a second location source could have an error of 50 meters. Two sets of globs could be made up of regular square grid patterns with side lengths of 2 and 20 meters and associated maximum quantization error of $\sqrt{2}$ and $10\sqrt{2}$, respectively. Thus, an appropriate assignment would be to associate the set of 2 meter globs with the location source having an RMS error of 10 meters and the set of 20 meter globs with the location source having an RMS error of 50 meters.

Third, aggregate the data points into the chosen set or sets of globs 0730 by using the definition of each individual glob and the attributes of the data points associated with the glob set. In spatial case, data points from a given subset falling within the spatial boundaries of a given glob associated with the subset of data points could then be associated with that glob. Fourth, compute any desired attributes for the globs 0740 as a function of their definitions and their constituent data points.

In another implementation of method 0700, the data points could be divided into subsets based on the resolution of their time information in step 0720.

In the case of time resolution example, the subset of globs could be selected based on the temporal resolution of the glob set and the precision of the timestamps of the data points. As one example, a first set of data points could have timestamps precise down to 1 second, and a second set of data points could have timestamps precise to a resolution of 1 day. Two corresponding sets of globs could be made of regular intervals of length 1 second and 1 day, and the two data point subsets could be associated with the glob sets having the same resolution.

Third, aggregate the data points into the chosen set or sets of globs 0730 by using the definition of each individual glob and the attributes of the data points associated with the glob set. In the temporal case, data points from a given subset falling within the temporal boundaries of a given glob associated with the subset of data points could then be associated with that glob. Fourth, compute any desired attributes 0740 for the globs as a function of their definitions and their constituent data points.

Figure 8:
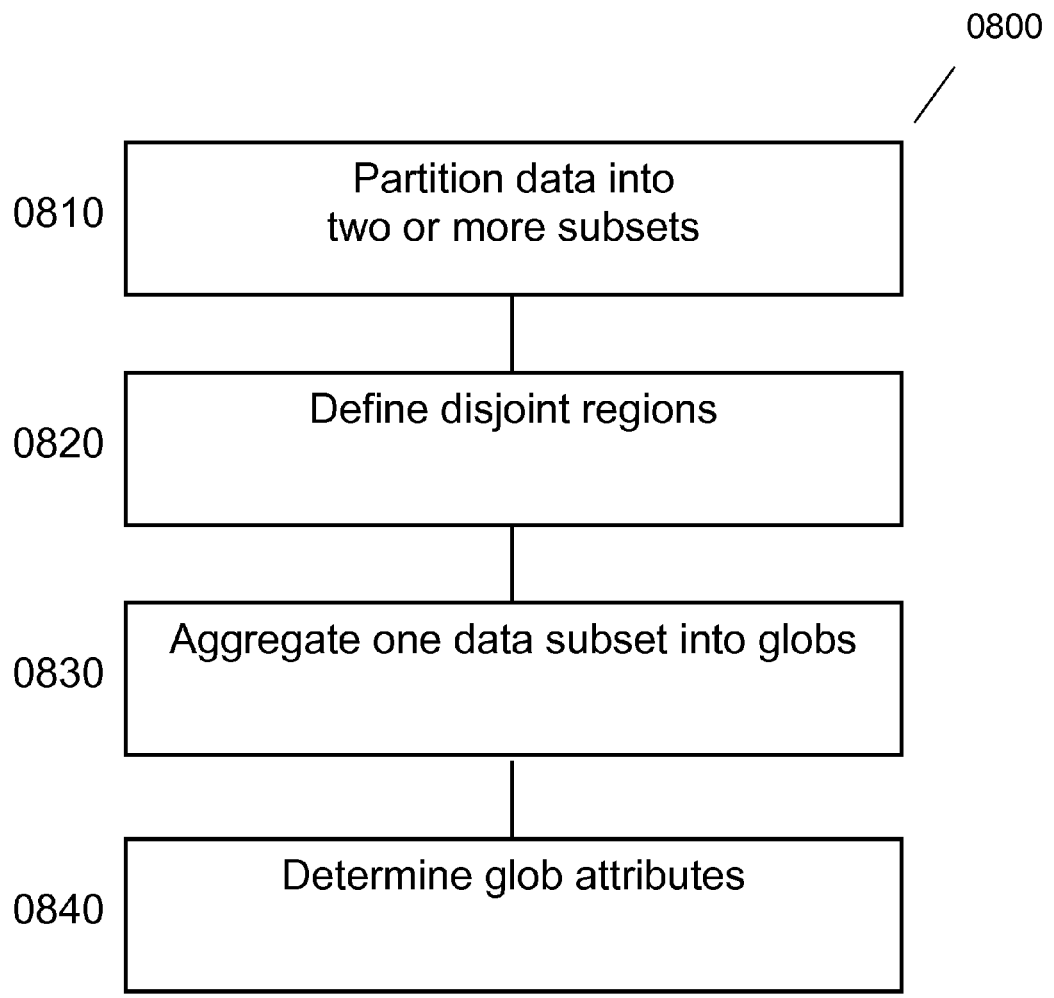
FIG. 8 illustrates a method of globbing only a subset of the data points while leaving other data points unaggregated.

FIG. 8 illustrates a method 0800 of globbing only a subset of the data points while leaving other data points unaggregated. First, partition the data points into two or more subsets 0810 and determine which subset or sets should be globbed. As one example, it may be inappropriate to glob submission data, so scan data points could be globbed while submission data was left unaggregated. As another example, it may be undesirable to glob data points whose location information has very small expected error because of the associated loss of location precision during spatial discretization. In this example, data points with lower quality location information could be globbed while the points with high-precision locations could be left unglobbed. Second, create the disjoint regions 0820 needed to define the globs. Third, for the subset of the data points to be globbed, assign the data points to globs 0830. Fourth, compute any desired attributes 0840 for the globs as a function of their definitions and their constituent data points.

Figure 9:
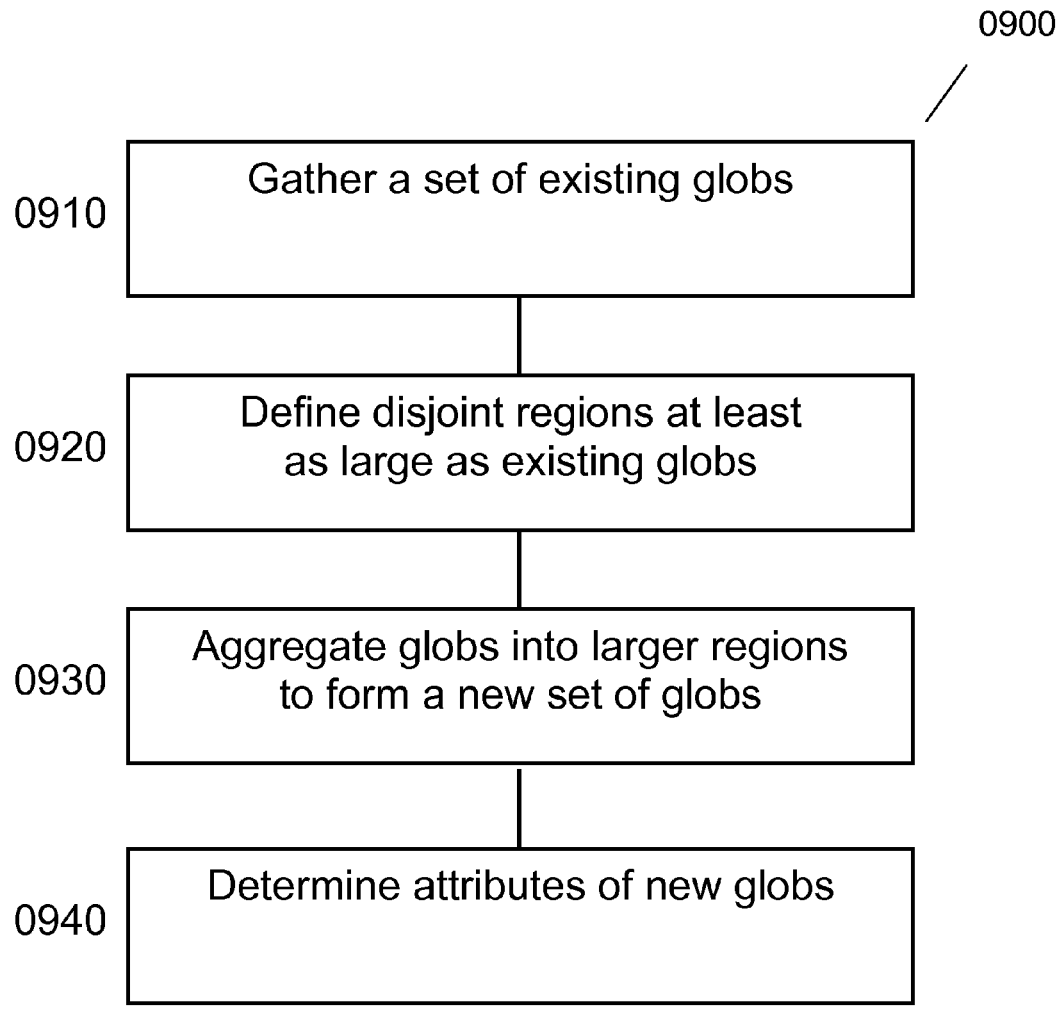
FIG. 9 illustrates a method of forming globs from other globs.

FIG. 9 illustrates a method 0900 of forming globs from other globs. First, collect the set of existing globs 0910. Second, create a second set of spatio-temporal regions 0920 such that the second set of regions has a coarser granularity than the set of existing globs. For instance, if the existing globs were defined according to a regular spatial grid of size 1×1 meter, the second set of regions could be defined by a grid of size 2×2 meters such that each new region would contain 4 of the existing regions. Third, assign the existing globs to the new set of larger globs 0930. Fourth, compute attributes of the new globs 0940 based on the attributes of their constituent, smaller globs. For instance, one attribute of interest could be an indicator of the presence of one or more data points that were positioned with GPS, so the attribute associated with the new globs would be a logical OR of the attributes of the smaller globs. As another example, the maximum number of reference points used to position any data point in the larger glob would be the maximum of the corresponding attributes of the smaller globs. As a third example, the minimum age of any data point in the larger glob would be the minimum of the corresponding attributes of the constituent globs.

Glob Attributes

Figure 10:
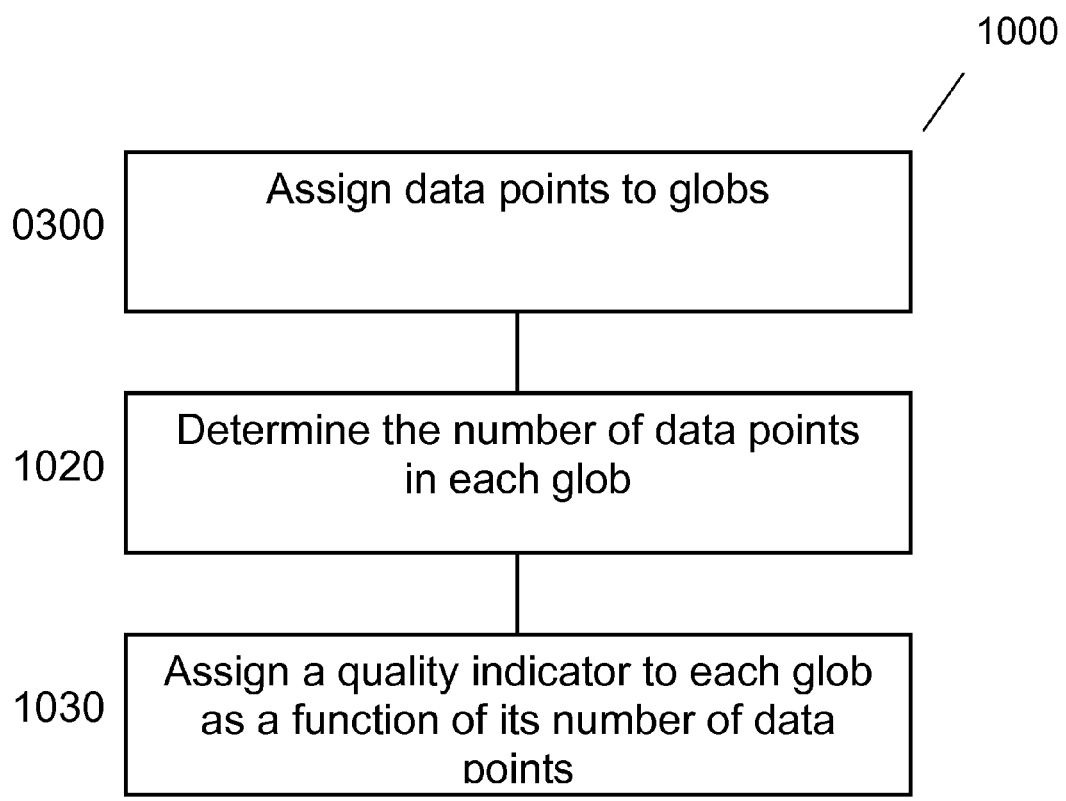
FIG. 10 illustrates a method of assigning a quality metric to a glob based on the number of data points included in the glob.

FIG. 10 illustrates a method 1000 of assigning a quality metric to a glob based on the number of data points included in the glob. First, assign data points to globs according to method 0300. Second, determine the number of data points corresponding to each glob 1020. Third, compute a quality indicator 1030 for the glob as a function of the number of data points. For instance, if the data points were assumed to suffer from coarse positioning errors independently of one another, then the probability that a glob arose entirely from data points with coarse positioning errors would fall exponentially with the number of data points. In this particular example, the quality metric, Q, could be related to the number of data points as $$Q = 1 - P^N$$

where P is the probability of an individual data point experiencing a coarse positioning error and N is the number of data points in the glob.

In a further implementation of method 1000, a quality metric is assigned to a glob based on information about the radio propagation environment. For instance, in a radio propagation environment that exhibits shadow fading, it is meaningful to derive a confidence interval for the mean RSS in order to understand the precision of transmission distance estimates based on the sample mean RSS, and quality metric Q (the quality indicator assigned in step 1030) could represent the width of the confidence interval.

If the shadow fading standard deviation is assumed to be 8 dB, then the width of the 67% confidence interval would be given by $$Q = 2\Phi^{-1}\left(\frac{1 - 0.67}{2}\right)\frac{8}{\sqrt{N}} \approx \frac{15.5858}{\sqrt{N}}$$

where N is the number of samples and, in this case, $\Phi$ represents the Gaussian tail integral.

$$\Phi(x) = \frac{1}{\sqrt{2\pi}} \int_x^\infty e^{\frac{-t^2}{2}} dt$$

Figure 11:
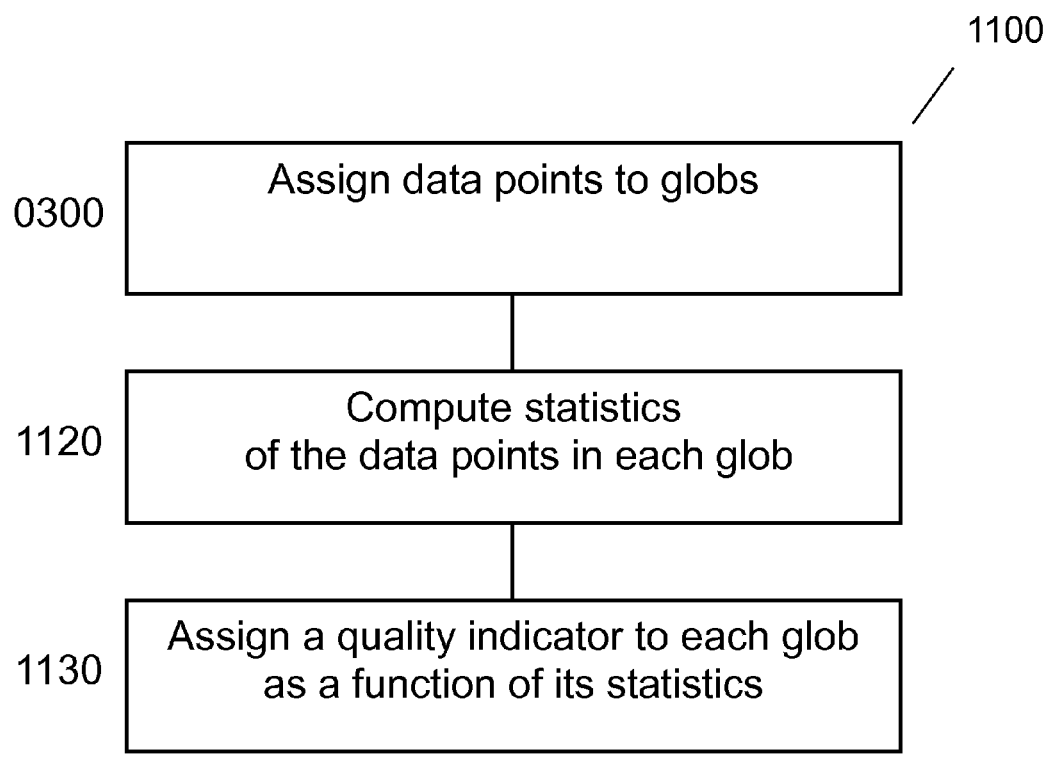
FIG. 11 illustrates a method of assigning a quality metric to a spatial glob.

FIG. 11 illustrates a method 1100 of assigning a quality metric to a spatial glob based on statistics of the times at which data points in the glob were collected. First, assign data points to globs according to method 0300. Second, compute one or more statistics of the times at which the data points were collected 1120. Third, determine a quality metric (i.e., a quality indicator), Q, as a function of the temporal statistics of the data points 1130. As one example, if data points collected within a one minute interval were assumed to be highly correlated but data points more than one minute apart were assumed to be statistically independent, then the difference between the maximum and minimum collection times would be an indicator of whether the glob contained at least two independent samples. Thus, a simple binary quality metric indicating the probability that the glob arose entirely from data points with coarse location errors would be given by $$Q = \begin{cases} 1 - P & (T_{max} - T_{min}) \leq 1 \\ 1 - P^2 & (T_{max} - T_{min}) > 1 \end{cases}$$

where T values indicate the ages of data points, P indicates the coarse error probability of a single data point, and Q gives a lower bound on the probability at least one data point in the glob had a good coarse position. As another example, the age of the newest sample in the glob could be used to assign a quality value based on the likelihood that the beacon continues to be observable from the glob's location. In this second example, Q could be a piecewise linear function of A, the age of the newest data point in the glob.

$$Q = \begin{cases} Q_{max} & A < A_{min} \\ Q_{max} - (A - A_{min})\frac{Q_{max} - Q_{min}}{A_{max} - A_{min}} & A_{min} \leq A \leq A_{max} \\ Q_{min} & A > A_{max} \end{cases}$$

Figure 12:
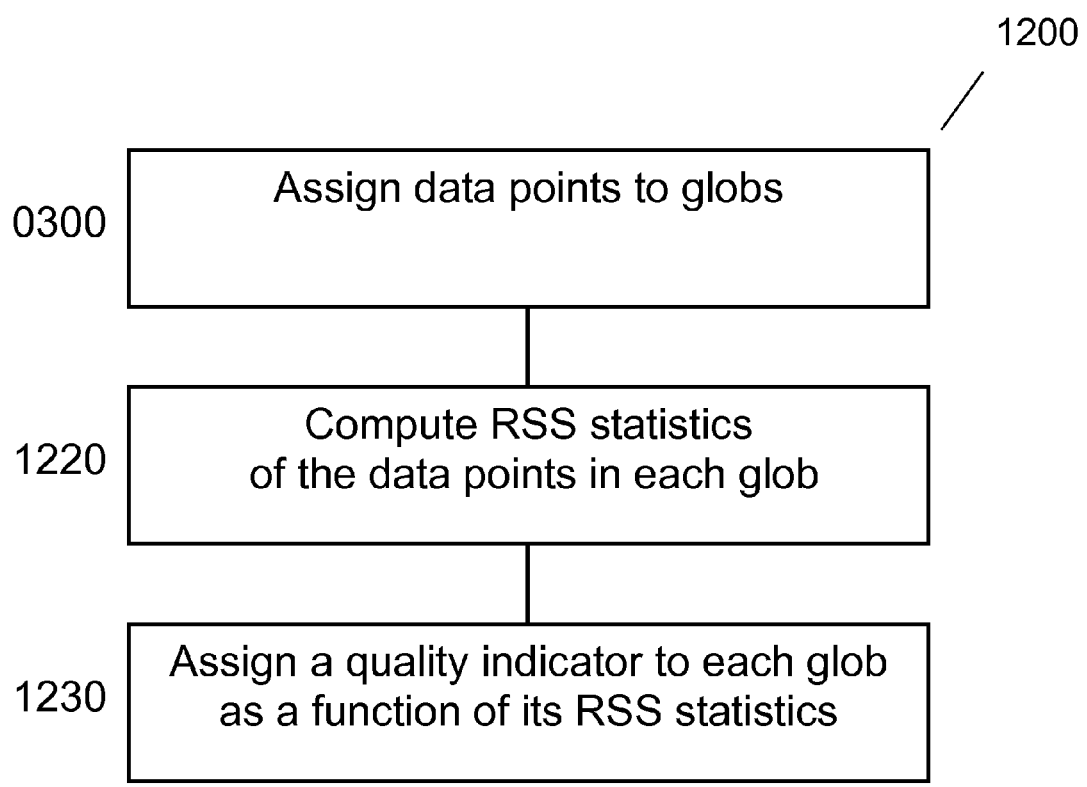
FIG. 12 illustrates a method of assigning a quality metric to a glob.

FIG. 12 illustrates a method 1200 of assigning a quality metric to a glob based on the statistics of the received signal strength of the scans included in the glob. First, assign scans to globs according to method 0300. Second, compute statistics of the received signal strength values of scans associated with each glob 1220. For instance, the sample standard deviation of the RSS values in the glob would serve as an indicator of the accuracy of range estimates derived from the mean RSS. Third, assign a quality indicator to each glob 1230. In this example, quality factor Q would be given by $$Q = \sqrt{\frac{1}{N-1}\sum_{i=1}^{N}(RSS_i - \mu_{RSS})^2}$$

where N is the number of samples in the glob.

Figure 13:
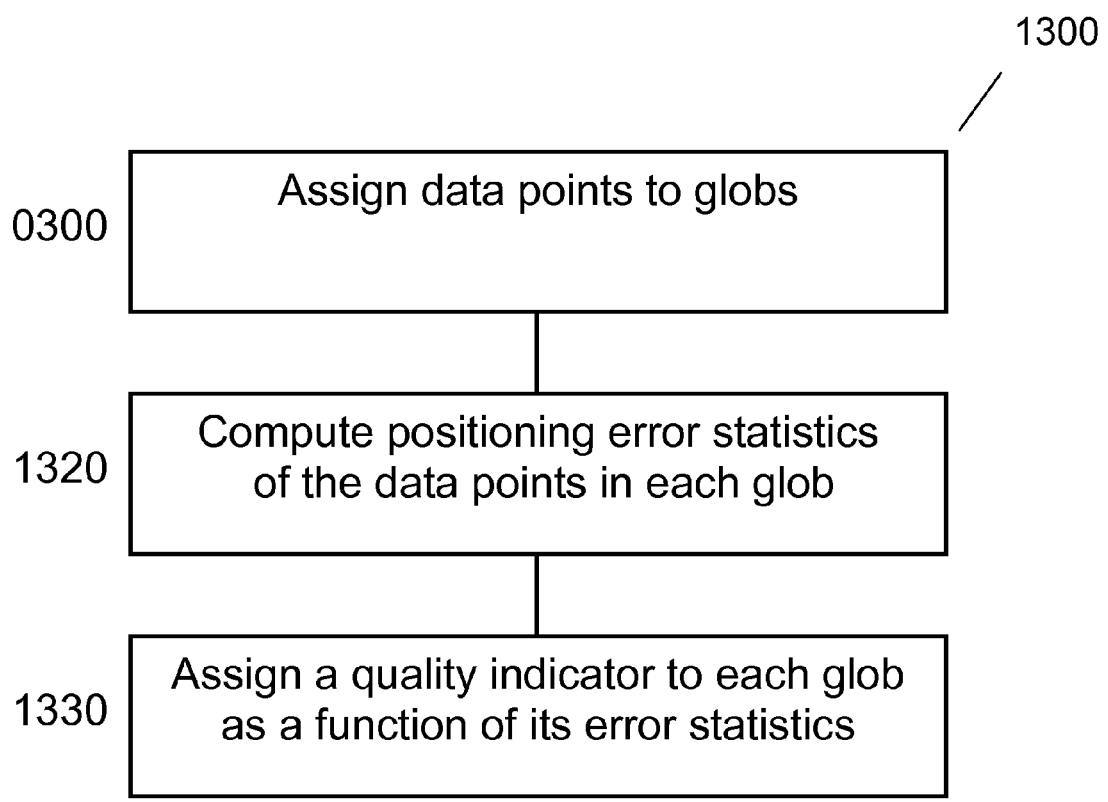
FIG. 13 illustrates a method of assigning a quality metric to a glob.

FIG. 13 illustrates a method 1300 of assigning a quality metric to a glob based on the statistics of the reported location error estimates of the scans in the glob 1300. First assign data points to globs according to method 0300. Second, generate statistics of the location error estimates associated with the data points assigned to each glob 1320. For instance, the minimum estimated location error of the set of data points can be used to indicate the overall quality of the data in the glob. Third, assign a quality indicator to each glob based on the statistics of the reported location error estimates 1330. In this example, quality indicator Q would be given by $$Q = \min(\{E_i\}_{i=1}^N)$$

where N is the number of samples in the glob and each Ei represents the error estimate of a single data point.

Figure 14:
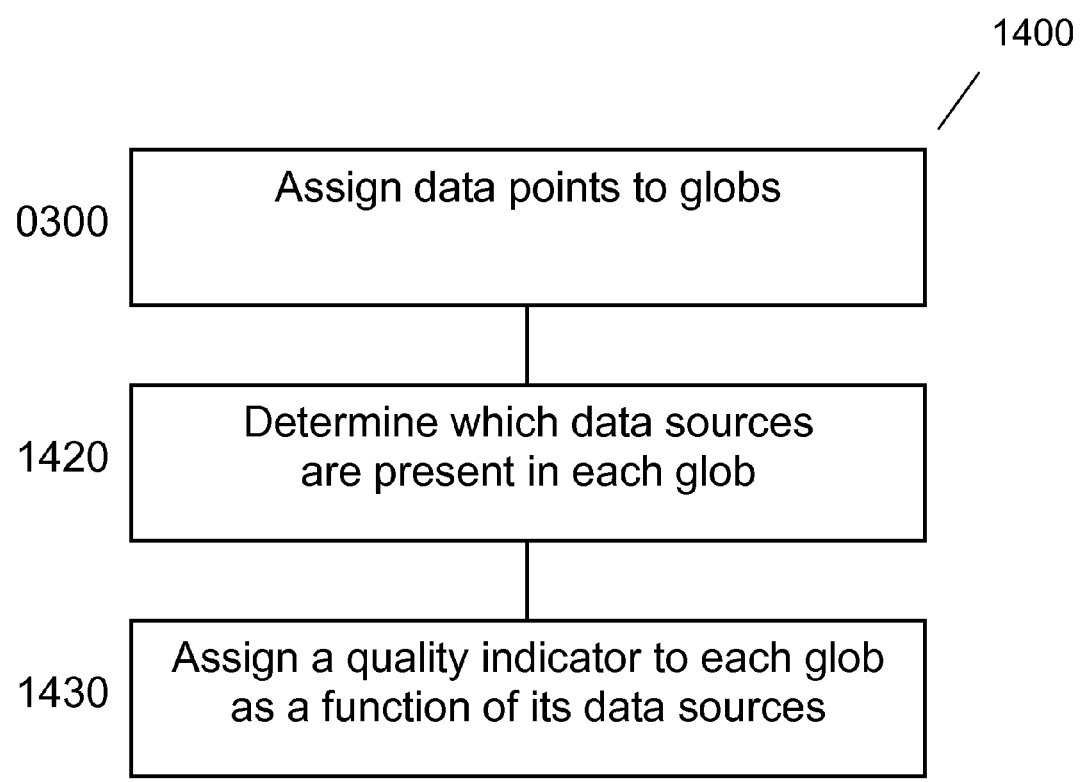
FIG. 14 illustrates a method of assigning a quality metric to a glob.

FIG. 14 illustrates a method 1400 of assigning a quality metric to a glob based on the sources from which data points in the glob were derived. First, assign data points to globs according to method 0300. Second, determine which data sources are present in each glob 1420. Third, assign quality metric Q to each glob according to the data sources present in the glob 1430. For instance, in a system where data points came from either client device scans or dedicated scanning device scans, Q could be assigned as follows $$Q = I(D > 0)$$

where I is the indicator function, and D is a binary value expressing the presence or absence of scans from dedicated scanning devices in the given glob. Hence, Q would be 1 if scans from a dedicated scanner were present and 0 otherwise. The implication is that dedicated scanning devices might be more trustworthy than client devices, and globs containing scans from dedicated scanning devices would provide more reliable information about the circumstances under which a given beacon was observable.

Figure 15:
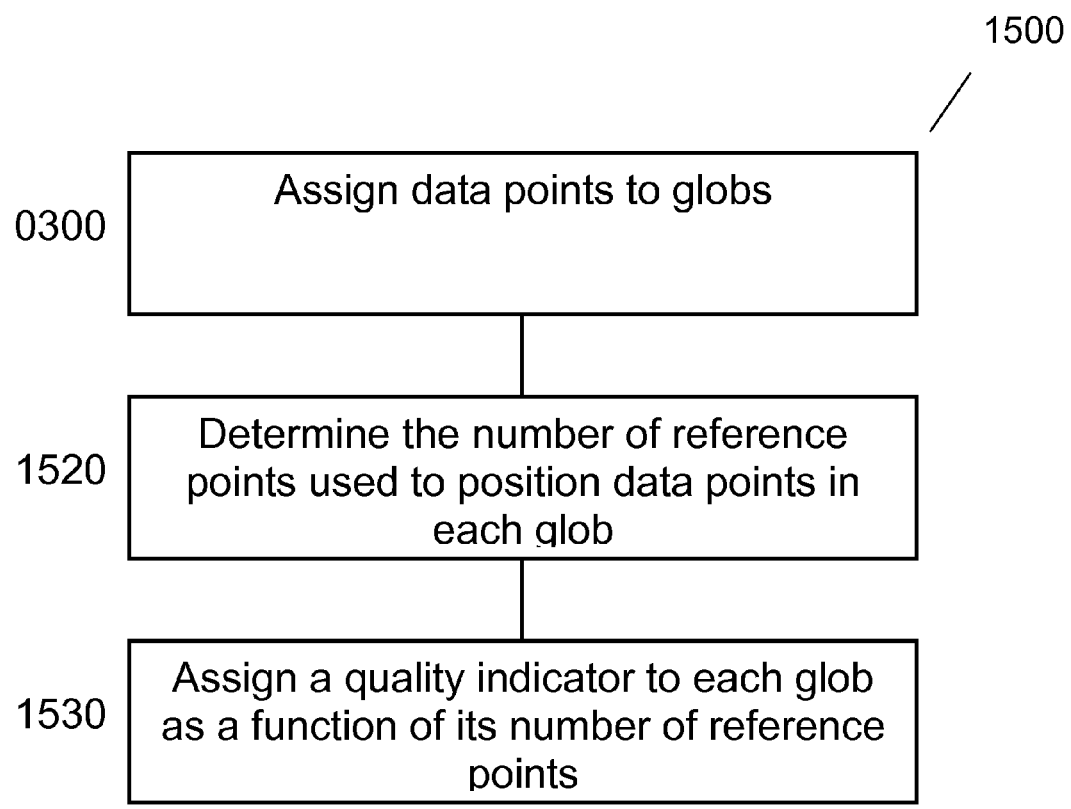
FIG. 15 illustrates a method of assigning a quality metric to a glob.

FIG. 15 illustrates a method 1500 of assigning a quality metric to a glob based on statistics of the number of different reference points used to position the data points in the glob. First, assign data points to globs according to method 0300. Second, determine the number of unique reference points used to provide location information to the data points in the glob 1520. Third, assign a quality indicator to each glob as a function of the number of unique reference points 1530. For instance, if the data points were positioned using beacons and each beacon had a probability P of a coarse location error, then quality indicator Q could be defined in terms of the number of unique beacons used to position the data points in a glob.

$$Q = 1 - P^N$$

where N is the number of unique beacons used for positioning the data points and P is the probability that a given beacon exhibited a coarse positioning error. The principle is that the likelihood of large numbers of independent beacons undergoing the same coarse positioning error is exceedingly small, so large numbers of beacons indicate that the glob results from valid coarse positioning information.

Figure 16:
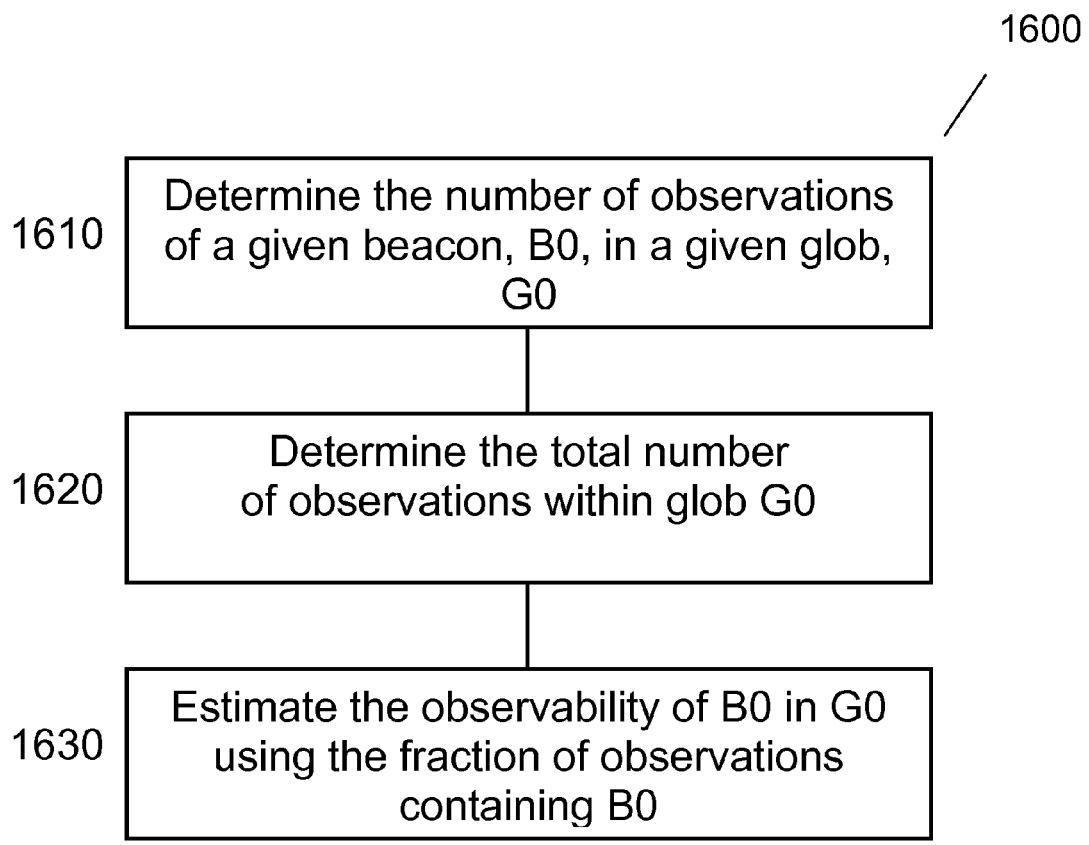
FIG. 16 illustrates a method of assigning an observation probability to globs.

FIG. 16 illustrates a method 1600 of assigning an observation probability to globs. Observation probability is a useful quantity in a number of applications including distance estimation and quality factor computation. The utility of observation probability for distance estimation arises from the fact that in many applications beacons will have significantly higher observation probability closer to the location of the beacon. Observation probability is useful for quality factor computation because a high observation probability can indicate that the beacon is stable and continuously observable from a given location. Conversely, a mobile beacon could have a low observability, indicating that it is unstable and cannot dependably be observed from a given location.

For a given beacon-glob pair, first determine the number of observations 1610 of the given beacon, B0, that are associated with the glob of interest, G0. Second, determine the total number of observations associated with the glob G0 1620. Third, for each glob, compute an estimate of the observability of B0 (the probability of observing beacon B0 with a random scan located in that glob) 1630. The observability estimate could simply be the empirical observation probability, $\hat{P}_j$, of the samples in each glob $$\hat{P}_j = \frac{1}{N_j} \sum_{i=1}^{N_j} I(B_0 \in S_i)$$

where the indicator function is 1 when a scan observes B0 and 0 otherwise, and $N_j$ is the number of scans in glob j.

Figure 17:
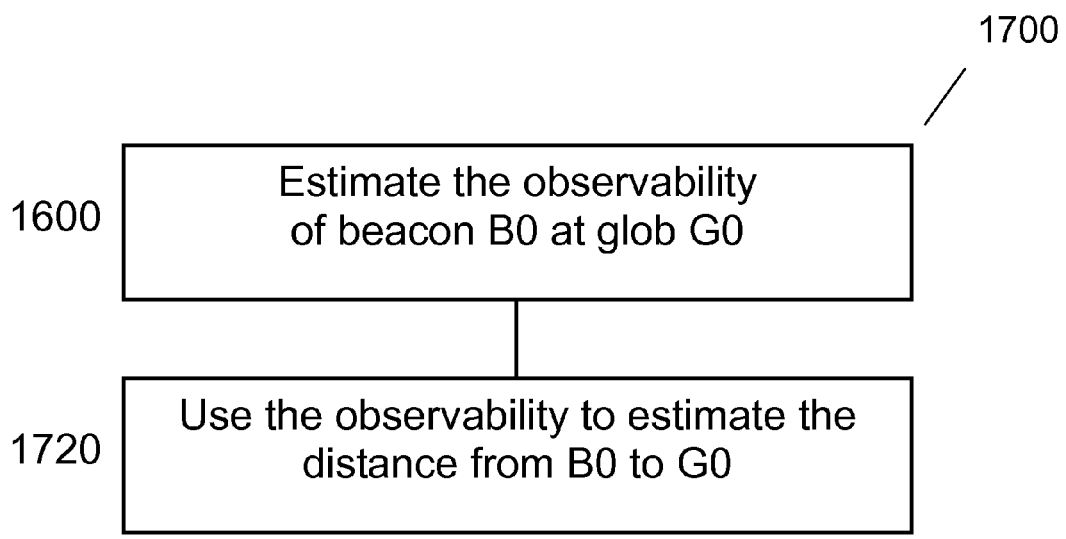
FIG. 17 illustrates a method for using observation probabilities to generate estimates of the distance between the glob and the beacon.

FIG. 17 illustrates a method 1700 for using observation probabilities to generate estimates of the distance between the glob and the beacon. First, estimate the observability of beacon B0 at glob G0 according to method 1600. Second, use the observability to estimate the distance from B0 to G0 1720.

One way to map observability values to distance estimates is to use regression techniques on empirical data. Another way to determine distance estimates is to use theoretical propagation models for pathloss and outage probability. As one example, if we consider a Rayleigh fading channel with pathloss exponent of 2, a WiFi beacon, and scanners with minimum RSS threshold of −90 dBm, we have the following pathloss equation for mean RSS, $P_{RX}$ $$P_{RX} = P_0 + 10\alpha \log_{10}\left(\frac{d_0}{d}\right)$$

and a normalized envelope threshold ρ

$$\rho^2 = \frac{10^{\frac{P_{min}}{10}}}{10^{\frac{P_{RX}}{10}}}$$

By combining the two, we can relate distance to expected observability.

$$\rho^2 = \frac{10^{\frac{P_{min}}{10}}}{10^{\frac{P_0 + 10\alpha \log_{10}(\frac{d_0}{d})}{10}}}$$

$$= \frac{10^{\frac{-90}{10}}}{10^{\frac{-20 - 20\log_{10}(d)}{10}}}$$

$$= 10^{\frac{-90 - (-20 - 20\log_{10}(d))}{10}}$$

$$= 10^{-9 + 2 + 2\log_{10}(d)} = 10^{-7} d^2$$

$$\hat{P}_j = e^{-\rho^2}$$

$$\hat{P}_j = e^{-10^{-7} d_j^2}$$

where d is the estimated distance as a function of observability.

$$d = \sqrt{-10^7 \log(\hat{P})}$$

Figure 18:
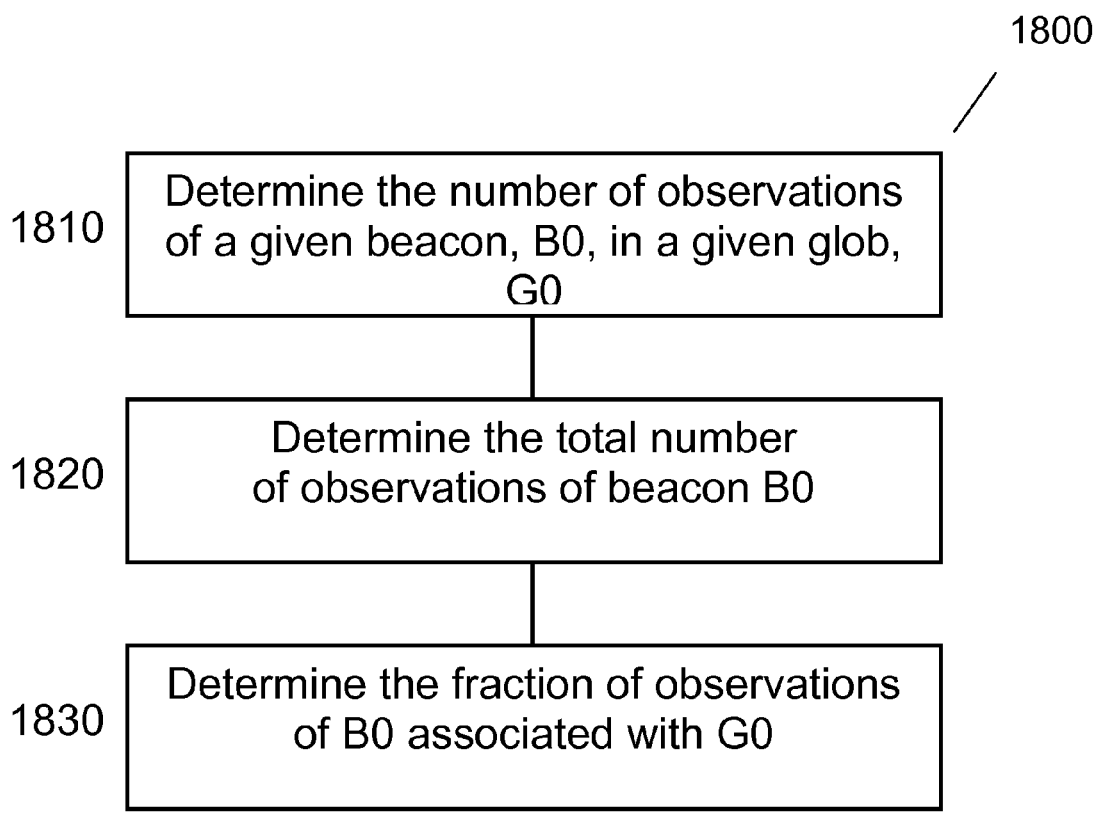
FIG. 18 illustrates a method of associating an observation fraction to a glob.

FIG. 18 illustrates a method 1800 of associating an observation fraction—the number of observations of beacon B0 associated with glob G0 divided by the total number of observations of beacon B0—to a glob. First, determine the number of observations of beacon B0 that are associated with glob G0 1810. Second, determine the total number of observations of beacon B0 1820. Third, compute the scan fraction, F, corresponding to glob G0 1830.

$$F_j = \frac{N_j}{\sum_{k=1}^{M} N_k}$$

where N is the number of observations in each glob and M is the total number of globs.

Figure 19:
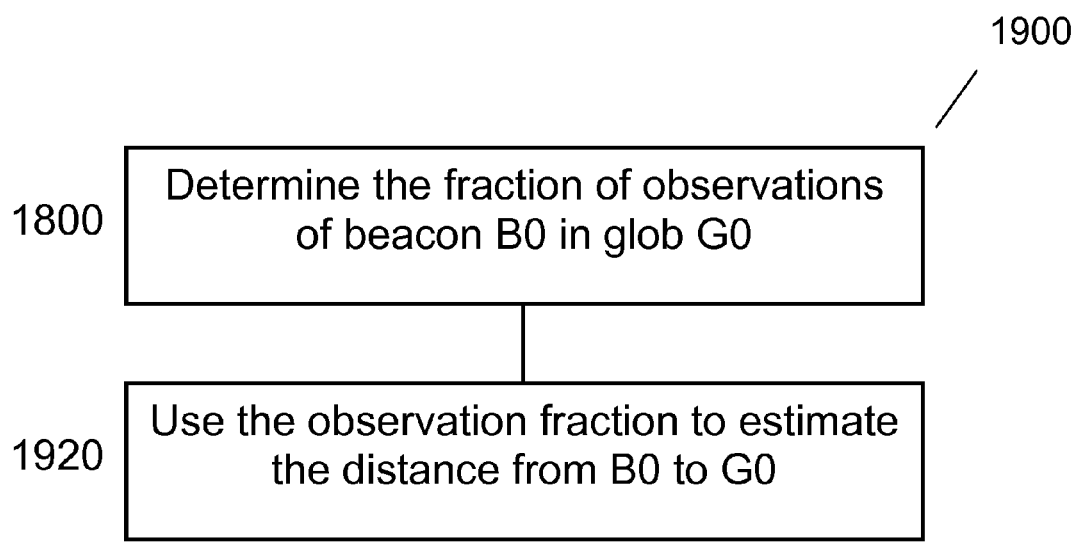
FIG. 19 illustrates a method of using the observation fraction to generate an estimate of the distance between a beacon and a glob.

FIG. 19 illustrates a method 1900 of using the observation fraction—the number of observations of beacon B0 associated with glob G0 divided by the total number of observations of beacon B0—to generate an estimate of the distance between beacon B0 and glob G0. First, determine the fraction of observations of beacon B0 in glob G0 according to method 1800. Second, use the observation fraction to estimate the distance from B0 to G0 1920.

One way to do this would be to perform a regression analysis of empirical data. For instance, generating a least squares fit of a power-law function would yield a distance estimator of the form $$d_j = A \times F_j^B$$

where reasonable values of A and B could be 50 and −0.4, respectively. Another way to map scan fractions to distance estimates is to view the scan fractions as normalized observability probabilities and use fading models to relate the scan fractions to distance.

$$\hat{P}_j = CF_j$$

Returning to the scenario from Example 8 (distance estimation based on observability), we have $$d = \sqrt{-10^7(\log(F) - \log(C))}$$

where the value of C could be selected to satisfy a constraint on the minimum allowable distance estimate. For instance, the minimum allowable distance estimate could be 10 meters in this case.

$$C > \max(\{F_j\}_{j=1}^{N}) + e^{\frac{d_{min}^2}{10^7}} = \max(\{F_j\}_{j=1}^{N}) + e^{\frac{100}{10^7}} = \max(\{F_j\}_{j=1}^{N}) + e^{10^{-5}}$$

Figure 20:
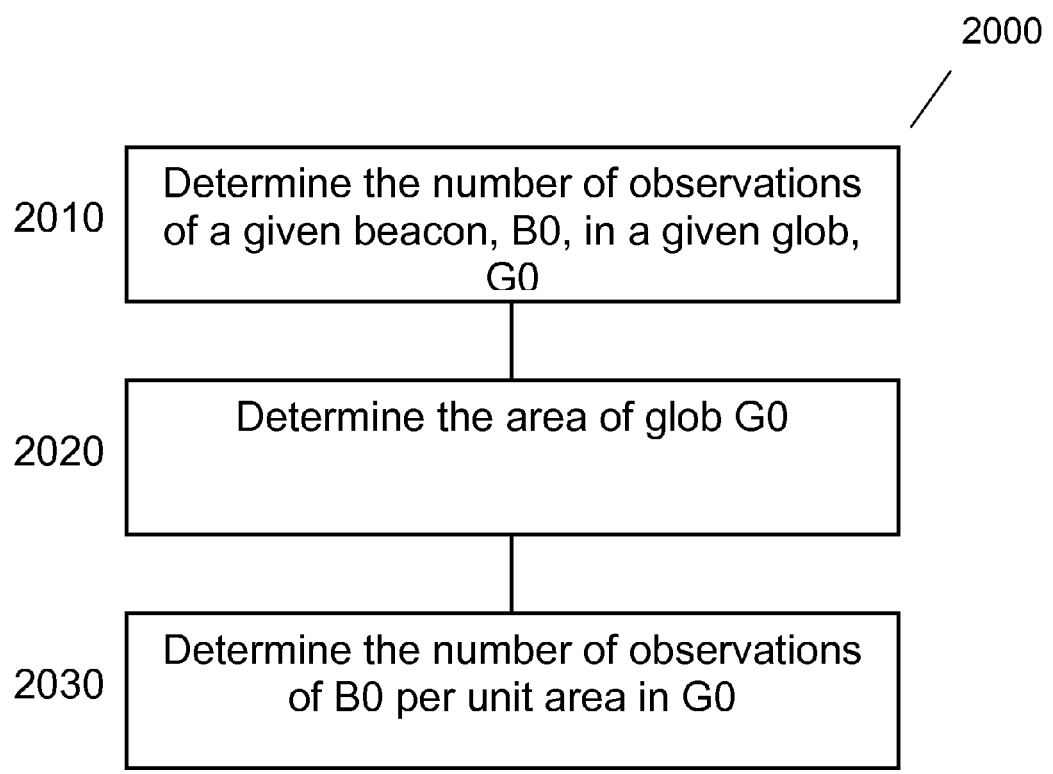
FIG. 20 illustrates a method of associating a measure of observation density with a glob.

FIG. 20 illustrates a method 2000 of associating a measure of observation density with a glob. This embodiment is particularly well-suited to systems using globs of more than one size.

First, determine the number of observations of B0 that are associated with glob G0 2010. Second, determine the area of glob G0 2020. Third, compute the observation density, H 2030.

$$H_0 = \frac{N_0}{A_0}$$

where N is the number of observations on G0 and A is the area of G0.

Figure 21:
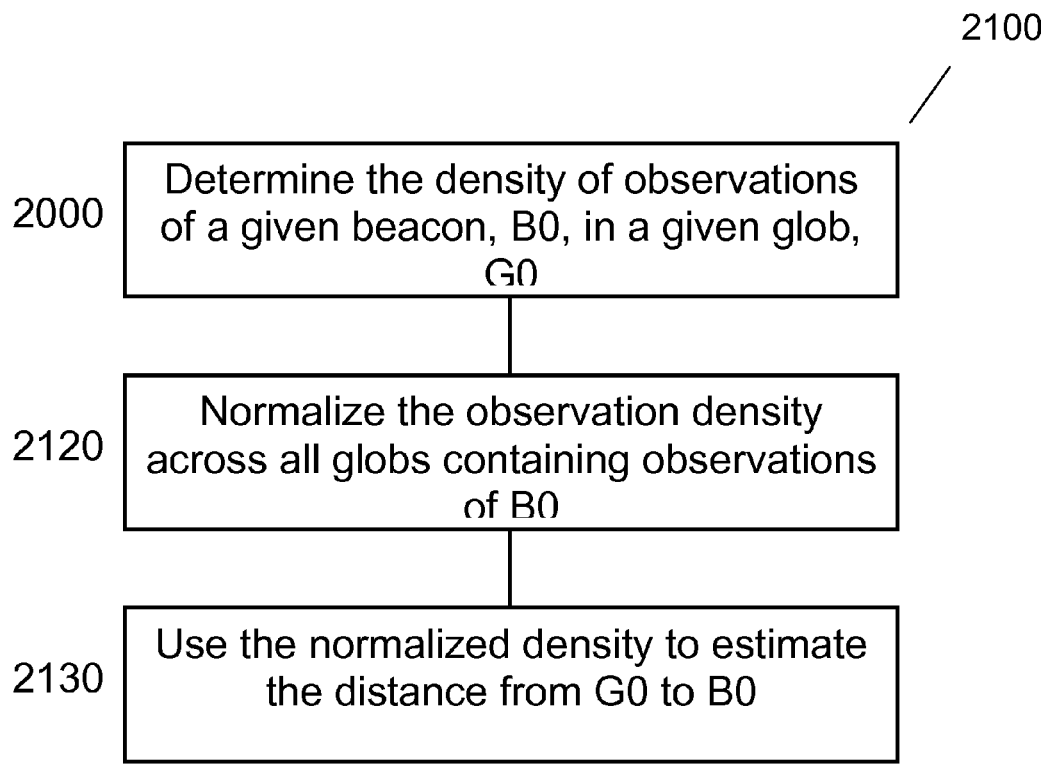
FIG. 21 illustrates a method of associating with glob an estimate of the distance between the glob and a beacon.

FIG. 21 illustrates a method 2100 of associating with glob G0 an estimate of the distance between glob G0 and beacon B0 based on the density of observations of beacon B0 in glob G0. First, determine the density of observations of beacon B0 in glob G0 according to method 2000. Second, normalize the observation density values such that the sum of the normalized density values 2120 across all globs containing observations of beacon B0 equals 1.

$$F_j = \frac{H_j}{\sum_{k=1}^{M} H_k}$$

Third, used the normalized density to estimate the distance from G0 to B0 2130. The normalized observation densities can be treated as observation fractions and mapped to distance estimates using the same techniques.

$$\hat{P}_j = CF_j$$

Then we have $$d = \sqrt{-10^7(\log(F) - \log(C))}$$

where the value of C could be selected to satisfy a constraint on the minimum allowable distance estimate. For instance, the minimum allowable distance estimate could be 10 meters in this case.

$$C > \max(\{F_j\}_{j=1}^{N}) + e^{\frac{d_{min}^2}{10^7}} = \max(\{F_j\}_{j=1}^{N}) + e^{\frac{100}{10^7}} = \max(\{F_j\}_{j=1}^{N}) + e^{10^{-5}}$$

Figure 22:
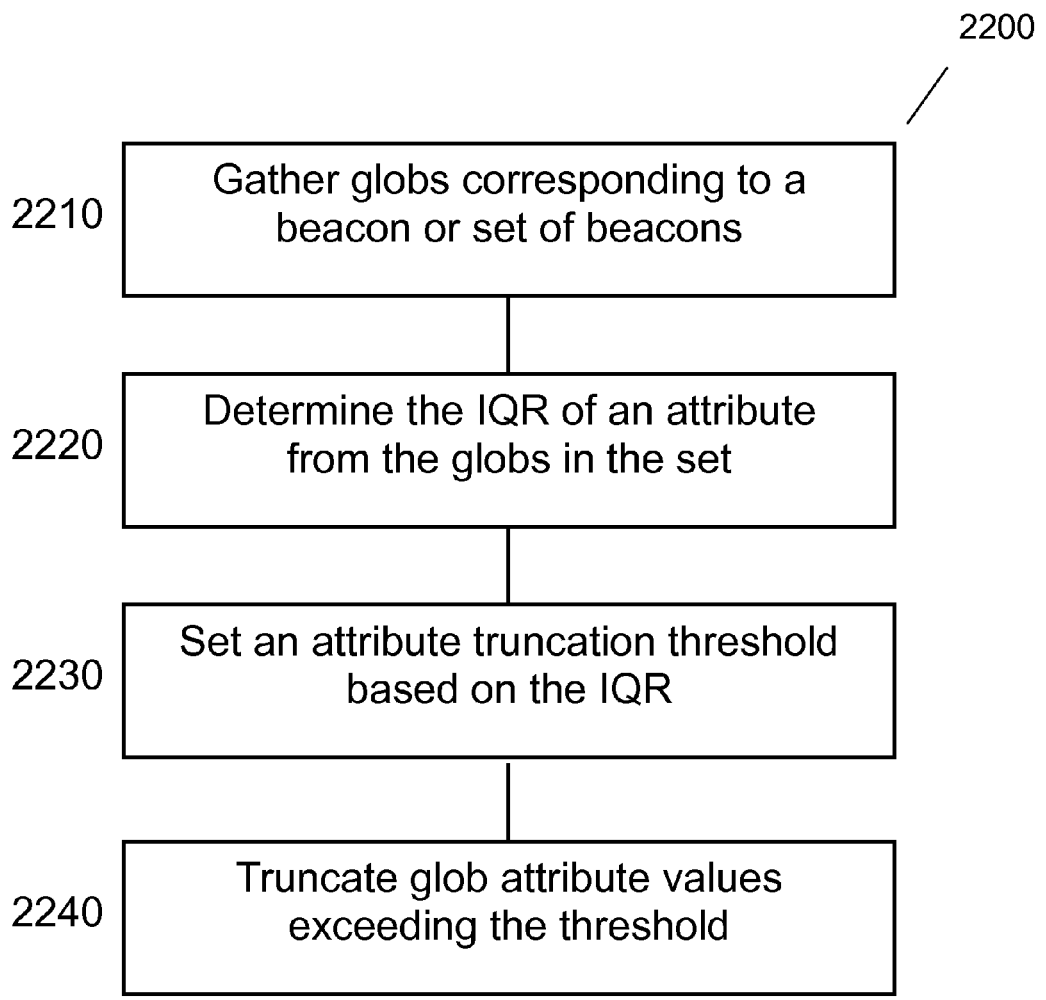
FIG. 22 illustrates a method for suppressing spurious data by truncating glob attributes that appear to be outliers.

FIG. 22 illustrates a method 2200 for suppressing spurious data by truncating glob attributes that appear to be outliers using the inter-quartile range (IQR) of a set of globs. First, gather all of the globs to be used and the attributes of those globs 2210. For instance, gather a count of the number of scans in each glob. Second, find the interquartile range (IQR) of the attributes 2220: the scan counts in this example. Third, set an attribute truncation threshold, T, 2230 by multiplying the IQR by a factor M and adding the product to the 75th percentile value of the weighting attribute. For instance, a value of 3 times the IQR is often used in the literature of statistics to designate data points as outliers.

$$T = A_{75} + (A_{75} - A_{25}) \times M$$

where $A_{75}$ is the 75th percentile and $(A_{75} - A_{25})$ is IQR.

Fourth, identify any globs whose attribute exceeds the truncation threshold, and replace the attribute with the truncation threshold 2240.

$$A_i' = \begin{cases} A_i & A_i < T \\ T & A_i \geq T \end{cases}$$

The purpose of outlier suppression is to mitigate the effects of globs whose attributes take spurious extreme values. For instance, returning to the example of scan count per glob as the attribute of interest, if a small number of globs contain the vast majority of the total scans, it may indicate that those globs were the locations of some unusual user or device activity that defies underlying assumptions about the spatial sampling distribution. In order to match the observed values to the assumed sampling distribution, it is helpful to moderate the impact of the extreme points by bringing them back to the truncation threshold.

Figure 23:
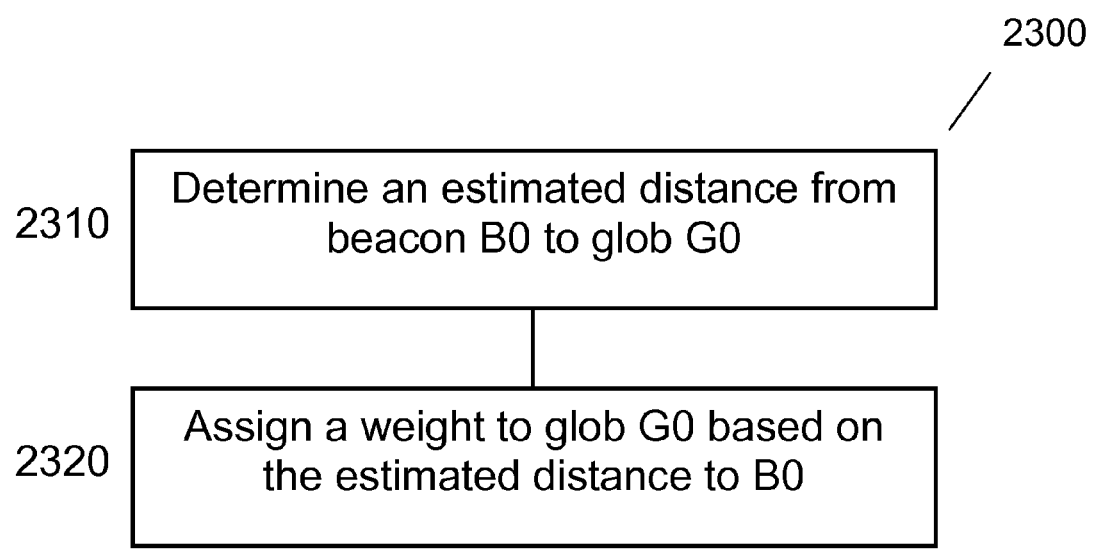
FIG. 23 illustrates a method of generating a weight for a glob based on attributes of the glob.

FIG. 23 illustrates a method 2300 of generating a weight for glob G0 based on attributes of the glob. In many applications, this weight would then be used to generate an estimate of the position of beacon B0. First, determine an estimated distance from beacon B0 to glob G0 2310. Second, Assign a weight to glob G0 based on the estimated distance to B0 2320.

As one example, weight w can be a function of glob G0's estimated distance to beacon B0, d.

$$w = \frac{1}{d^2}$$

Extending the example slightly, weight values can be generated directly from observation probabilities using techniques introduced earlier $$w = \frac{-10^{-7}}{\log(\hat{P})}$$

or from observation fractions using techniques $$w_j = \frac{-10^{-7}}{\log(F_j) - \log(C)}$$

$$w_j = A^{-2} F_j^{-2B}$$

Pathology Detection

Figure 24:
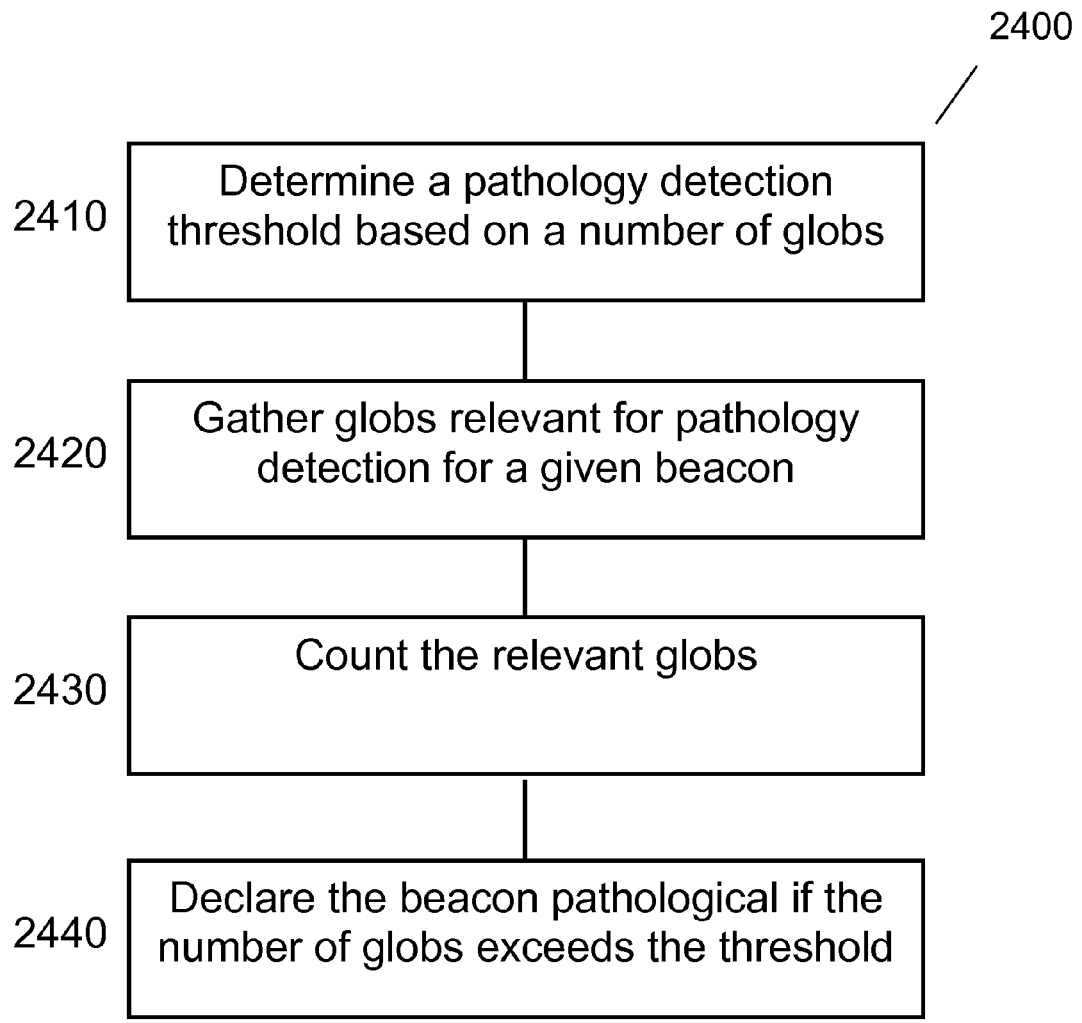
FIG. 24 illustrates a method of detecting beacon pathologies using a function of the number of globs from which a beacon has been observed.

FIG. 24 illustrates a method 2400 of detecting beacon pathologies using a function of the number of globs from which a beacon has been observed. First, determine a combination of spatial resolution and glob count threshold, G, 2410 such that beacons having more than G globs are pathological with a sufficiently high probability that constraints on false alarm and miss probability are satisfied. For instance, using a regular array of square globs of size 1 km by 1 km, beacons whose transmission range is typically less than 400 meters should not be seen in more than 4 globs unless the beacon has been relocated or exhibited some other pathology. Empirical data could be used to verify that non-pathological beacons appear in more than 4 globs with acceptably small probability (e.g. 0.1%) and pathological beacons appear in more than 4 globs with acceptably high probability (e.g. 90%).

Second, collect all globs to be used for determining whether or not the beacon is pathological 2420. Third, count the number of globs satisfying a minimum quality constraint 2430. For instance, the quality constraint could require the system to collect only globs containing scans whose location was supplied by GPS or scans whose source had expected squared location error of less than 500 meters, the purpose being to reduce the impact of poor scan location information on the total number of globs. Fourth, compare the count of the number of globs to a predetermined threshold, G, and declare the beacon to be pathological if it exceeds the threshold 2440.

Figure 25:
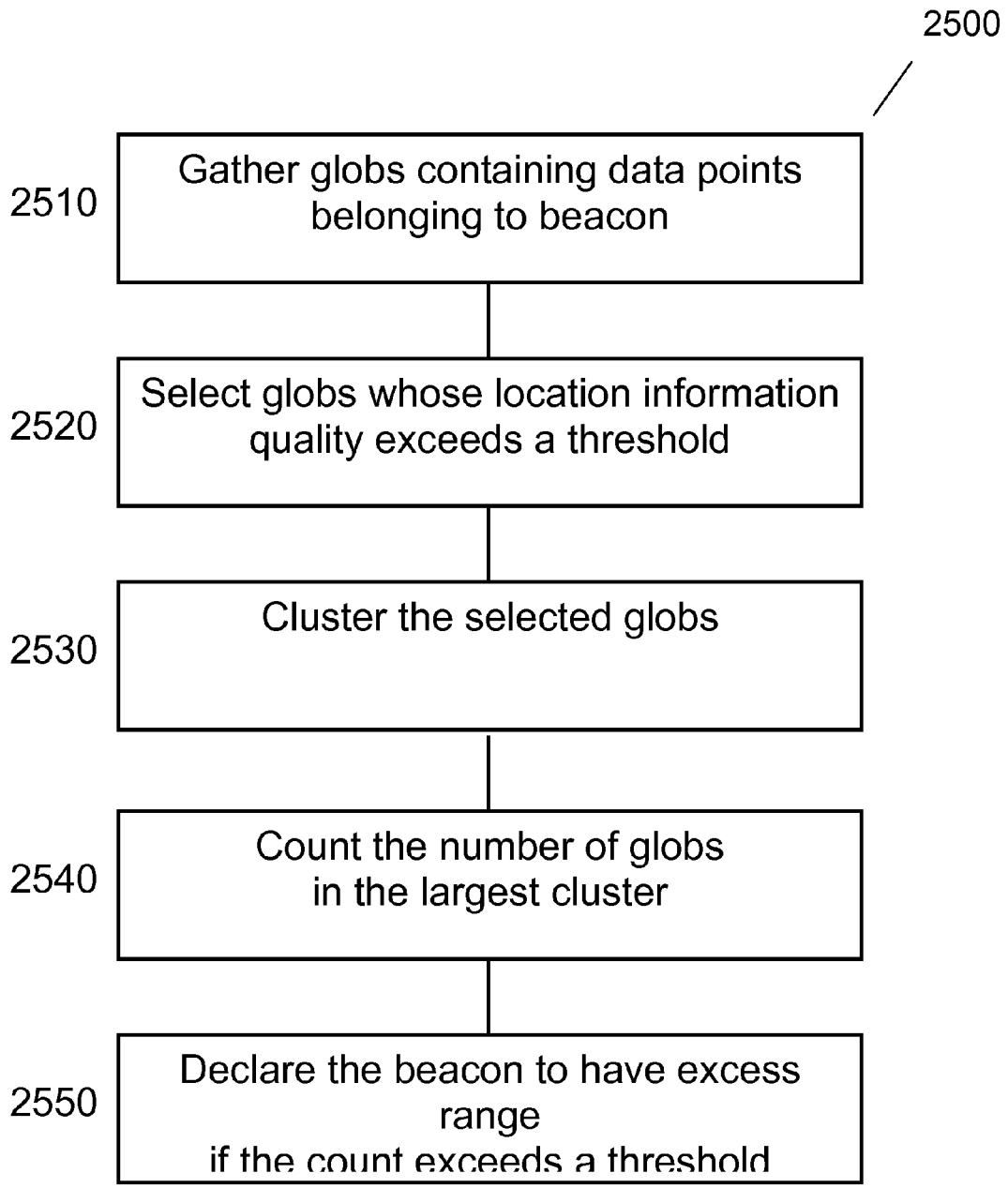
FIG. 25 illustrates a method of using a count of a number of clustered or adjacent globs for detecting that a beacon has excess range.

FIG. 25 illustrates a method 2500 of using a count of a number of clustered or adjacent globs for detecting that a beacon has excess range. First, gather globs belonging to the beacon 2510. Second, select globs with location information exceeding quality threshold Q 2520. Third, cluster the selected globs in space 2530. As one example, the connected graph clustering algorithm could be suitable for this case. Fourth, count the number of globs in the largest cluster (the cluster containing the maximum number of globs) 2540. Fifth, if the number of globs exceeds threshold G, then declare the beacon to have excess range 2550.

In practice, threshold G would be a function of the selected glob resolution and the expected range of beacons of the same type as the beacon being screened for excess range. For instance, a WiFi beacon having an expected range of 200 meters could be declared to have excess range if it was observed in more than 4 square globs measuring 400 meters on a side.

Figure 26:
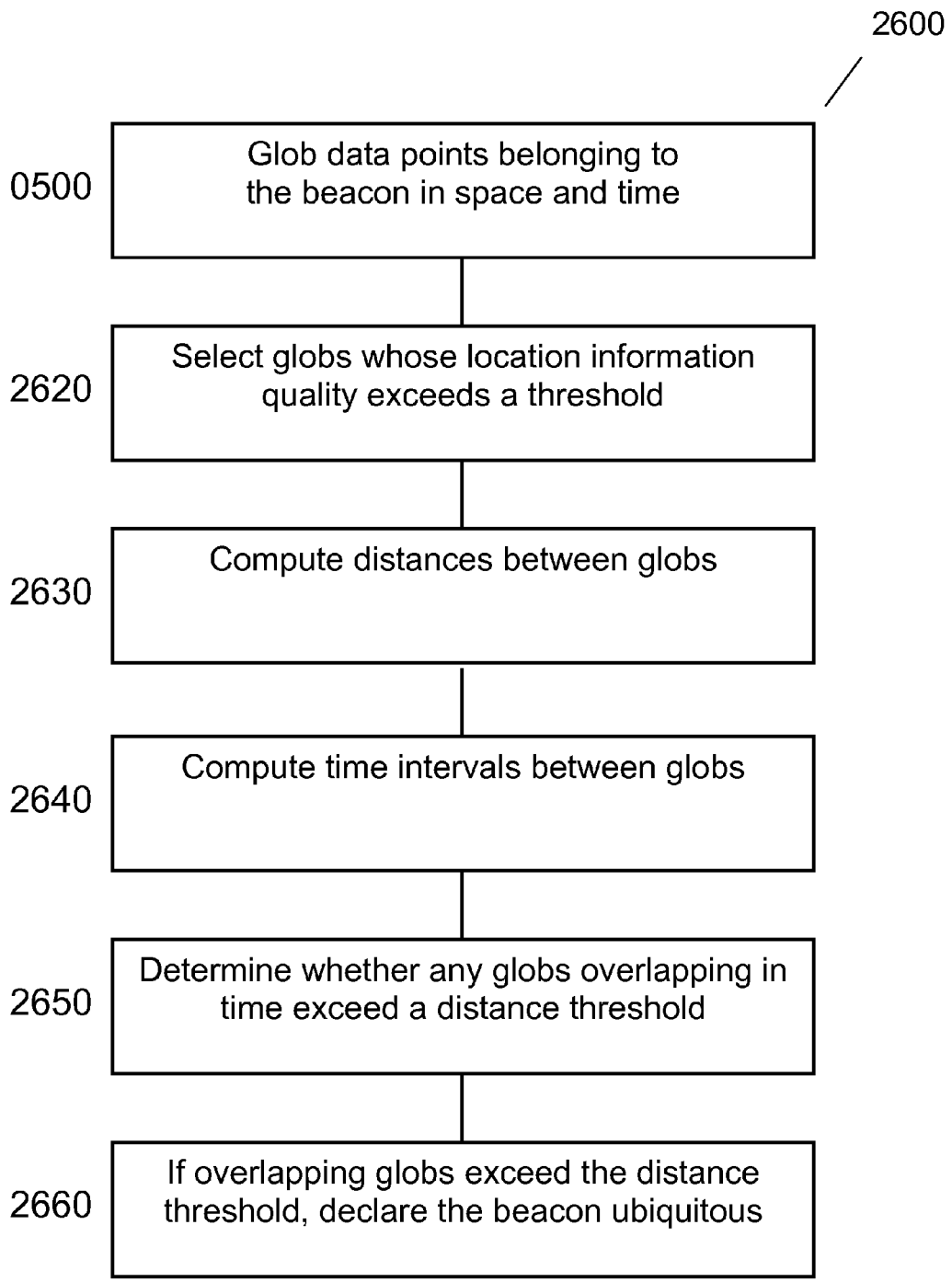
FIG. 26 illustrates a method of using the presence of multiple globs that contain observations of a single beacon at substantially the same time but whose positions are far from one another for detecting that a beacon is ubiquitous.

FIG. 26 illustrates a method 2600 of using the presence of multiple globs that contain observations of a single beacon at substantially the same time but whose positions are far from one another for detecting that a beacon is ubiquitous. First, glob the data points belonging to the beacon in space and time according to method 0500. Second, select all globs satisfying quality threshold Q 2620. An appropriate quality metric would indicate the probability that the glob in question arises from data points with valid location information. For instance, a quality metric indicating the presence of a trusted data source or a sufficiently large number of independent reference points would be applicable to this example. Third, compute the pairwise distances between the globs 2630. Fourth, compute the pairwise time intervals between the globs 2640. Fifth, determine whether any pair of globs with spatial distance greater than threshold D and time separation less than threshold T 2650. An appropriate value for threshold D would be significantly larger than the coverage radius of a typical beacon. As one example, 802.11 beacons with expected coverage radii of 400 meters could use a threshold of 2 kilometers. Sixth, if any such pair of globs exists, then declare the beacon to be ubiquitous 2660.

Coarse Positioning

Figure 27:
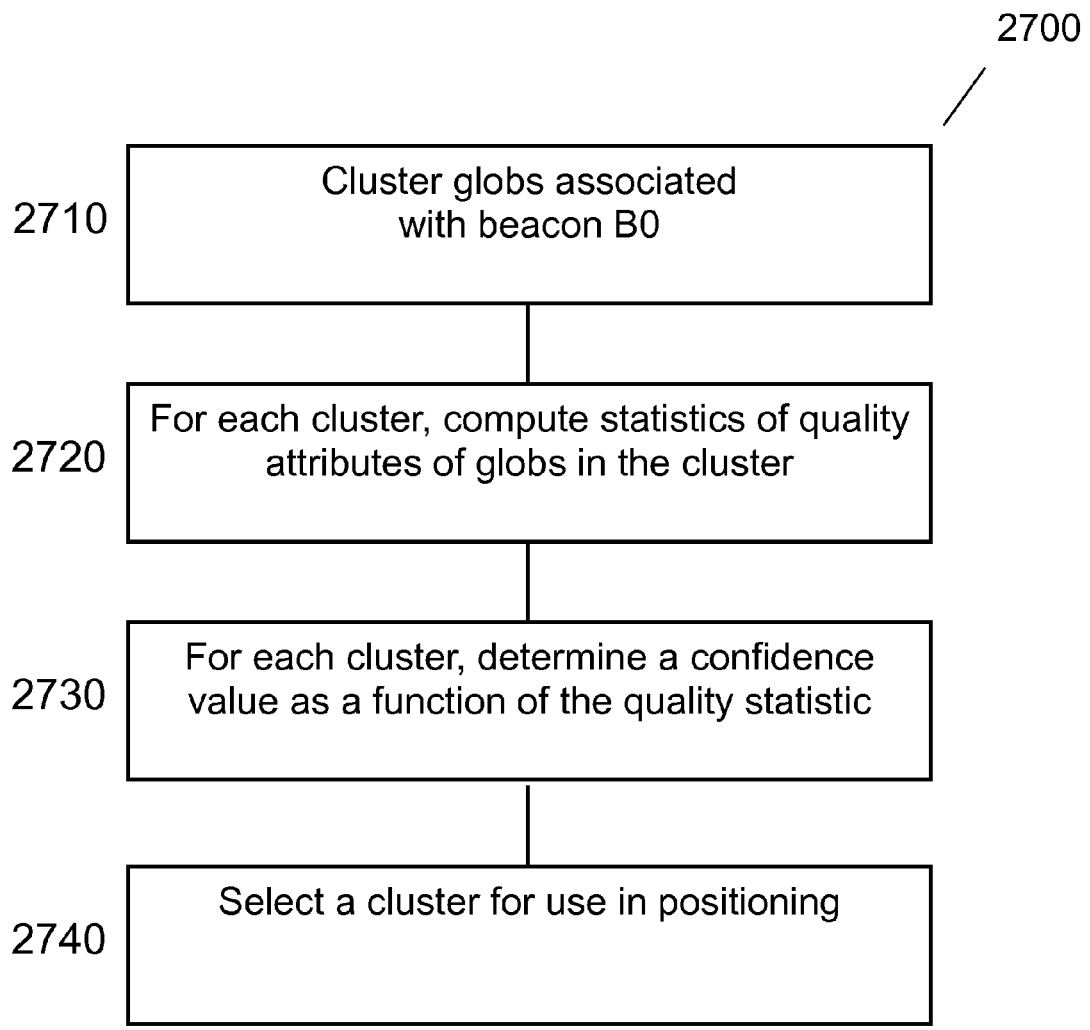
FIG. 27 illustrates a method of assigning coarse location confidence to a cluster of globs based on statistics of the quality attributes of the globs in the cluster.

FIG. 27 illustrates a method 2700 of assigning coarse location confidence to a cluster of globs based on statistics of the quality attributes of the globs in the cluster. First, cluster globs 2710. Second, for each cluster, compute one or more statistics of the quality attributes associated with the globs 2720. For instance, the quality metric could be a function of the number of unique reference points used to position data points in each glob, and the statistic could the maximum quality value across all globs in the cluster. Third, determine a confidence value as a function of the quality statistic 2730.

The proper relationship between the glob quality statistic and the probability that a cluster reflects a correct current coarse position for the beacon will typically be found using empirical data and curve fitting strategies outlined previously. As one example, fitting an exponential function to empirical data could yield a function of the form $$C = 1 - Ae^{BQ_{max}}$$

where Qmax is the maximum number of reference points in our specific example, and A and B could take values 0.5 and −0.1, respectively. Thus, confidence would approach 1 asymptotically with increasing Qmax. Finally, select a cluster based on the assigned confidence values 2740.

Figure 28:
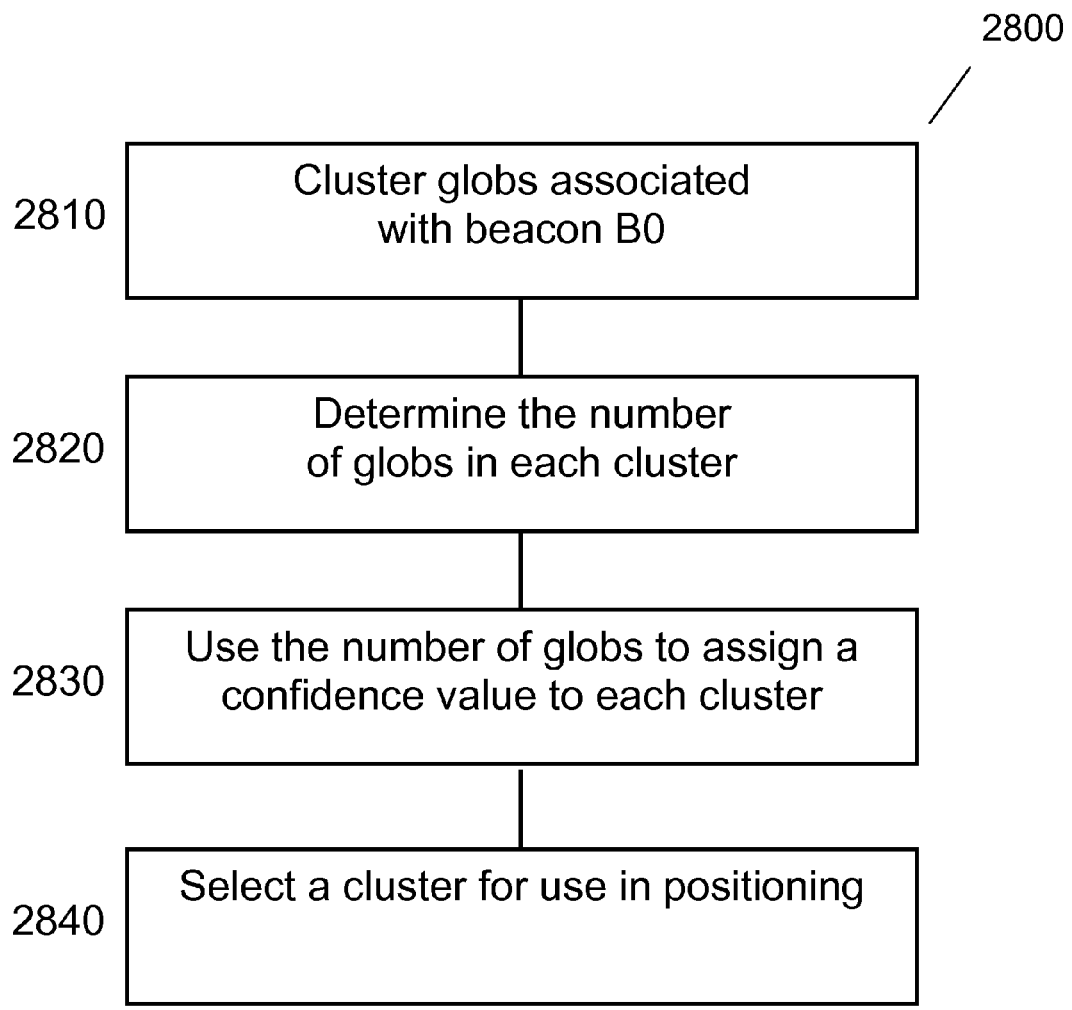
FIG. 28 illustrates a method of assigning a confidence value to a cluster based on the spatial footprint of the cluster.

FIG. 28 illustrates a method 2800 of assigning a confidence value to a cluster based on the spatial footprint of the cluster. The salient principle in this case is that spurious scan data will often form clusters that have very small spatial footprints. For instance, if a scanning device malfunctions and begins to assign incorrect location information to its scans, those scans will often fall within a very small number of discrete spatial units. As another example, if a single relocated beacon causes client devices to be positioned at the beacon's previous location, and those estimated client locations are then returned to the system as scan data, the scans will often form a very tight cluster centered on the beacon's previous location. In general, a small spatial footprint is a good indicator of a lack of diversity in scan data sources, meaning that the scans either came from a small number of devices or a number of devices receiving their location estimates from a small number of reference points, and a lack of scan diversity indicates a vulnerability to coarse positioning errors.

In order to construct an appropriate function relating the number of globs and the probability that a cluster of scans represents a valid beacon location, a reasonable procedure would be to collect a large training set of clusters whose validity is known and compute the empirical probability that a cluster is invalid as a function of the number of discrete spatial units occupied by the cluster. Then, one of ordinary skill in the art could avail himself of the numerous available regression techniques to find the most appropriate analytical function to match the empirical data.

According to method 2800, first, cluster the globs associated with the beacon 2810. Second, for each cluster, count the number of globs 2820. Third, use the number of globs to assign a confidence value to each cluster 2830. The proper relationship between the number of globs and the probability that a cluster reflects a correct current coarse position for the beacon will typically be found using empirical data and curve fitting strategies outlined previously. As one example, fitting an exponential function to empirical data could yield a function of the form $$C=1-Ae^{BN}$$

where N is the number of globs and A and B could take values 0.5 and −0.1, respectively. Thus, confidence would approach 1 asymptotically with increasing N. Finally, select a cluster based on the assigned confidence values 2840.

In another implementation of method 2800, a confidence value is assigned to a cluster based on the temporal footprint of the cluster. In this case, the operative principle is that spurious data will often appear in temporal bursts, so an inconsistent pattern of observation can indicate that a cluster should receive a low confidence value. As one example, if a cluster of observations was positioned incorrectly due to a mobile beacon that passed through the area, then the cluster of observations will occupy a temporal footprint whose length is determined by the length of time that the mobile beacon was present—likely to be a short time relative to high confidence clusters.

First, spatially cluster the globs associated with the beacon 2810. The globs should be defined in both time and space and the temporal resolution should be appropriate for differentiating between transient and persistent clusters. As an example, the temporal resolution of the globs could be on the order of 1 day. Second, for each cluster, count the number of distinct time intervals occupied by the globs in the cluster 2820. Third, use the number of time intervals to assign a confidence value to each cluster 2830. In many applications, it would be appropriate to form the confidence function by analyzing empirical data using one of the methods outlined earlier. As an alternative, the confidence function could take the following form where N is the number of time intervals and P is the probability of a single time interval arising from spurious observations.

$$C=1-P^N$$

Finally, select a cluster based on the assigned confidence values 2840.

Figure 29:
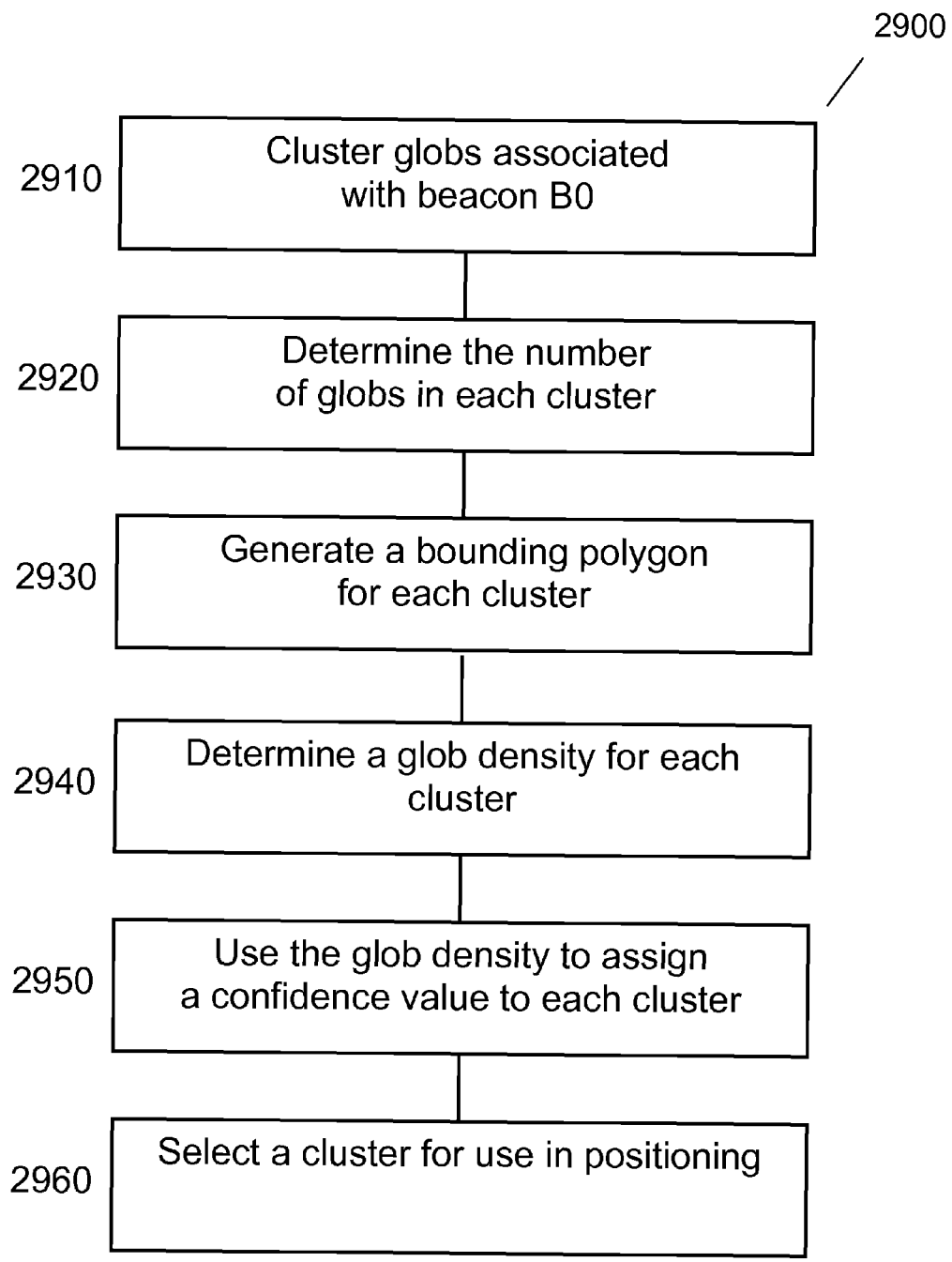
FIG. 29 illustrates a method of assigning a confidence value to a cluster based on the density of globs within the cluster's footprint.

FIG. 29 illustrates a method 2900 of assigning a confidence value to a cluster based on the density of globs within the cluster's footprint. First, cluster the globs associated with the beacon 2910. Second, for each cluster, count the number of globs 2920. Third, generate one or more bounding polygons to capture the area occupied by the cluster 2930. As one example, use the square with one corner at the maximum latitude, maximum longitude point and another corner at the minimum latitude, minimum longitude point in the cluster. As another example, use the circle centered at the mean latitude and mean longitude with the minimum radius sufficient to contain all of the globs in the cluster.

Fourth, determine a glob density, D, describing the number of globs per unit area of the cluster 2940. As one example, normalize the glob density such that it is the product of the total number of globs and the area occupied by each (disjoint) glob divided by the total area computed earlier. Thus, D would be bounded by 0 and 1, inclusive.

$$D = \frac{NA_{glob}}{A_{total}}$$

$$0 \leq D \leq 1$$

Fifth, using the number of globs and the density, assign a confidence value, C, to each cluster 2950.

$$C=1-D$$

Finally, select a cluster using the derived confidence values 2960.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. Any of the values determined by the techniques set forth herein can be displayed on the mobile device and/or transmitted to other devices and/or computer systems.

What is claimed is:

1. A method of estimating a characteristic of a wireless beacon, the method comprising:
   receiving a set of data points at software executing on an electronic device, each data point containing information about beacon attributes of a wireless beacon;
   dividing at least one dimension into a set of regions, each region of the set having region boundaries that do not overlap with other regions of the set;
   associating each data point with one corresponding region based on at least one element of the information of the data point lying within the boundaries of the corresponding region;
   determining an aggregate attribute for each region based on the information of the data points associated with the corresponding region; and
   estimating, by the software, the characteristic of the wireless beacon based on at least one aggregate beacon attribute, the characteristic of the wireless beacon being an estimated geographic location of the wireless beacon, a measure of suitability of the wireless beacon for use as a reference point by a wireless positioning system or a measure of confidence in the estimated geographic location of the wireless beacon.

2. The method of claim 1, the estimated characteristic of the wireless beacon being the estimated geographic location of the wireless beacon.

3. The method of claim 2, the at least one dimension being a spatial dimension and the element of the information of the data point being an estimated location at which radio signals from the wireless beacon were detected.

4. The method of claim 3, the aggregate attribute for each region being an aggregate location.

5. The method of claim 1, the at least one dimension being a temporal dimension and the element of the information of the data point being an estimated time at which radio signals from the wireless beacon were detected.

6. The method of claim 5, the aggregate attribute for each region being a count of a number of distinct estimated locations at which radio signals from the wireless beacon were detected, each distinct estimated location being spaced apart from at least one other distinct estimated location by more than a threshold distance.

7. The method of claim 6, the estimated characteristic of the wireless beacon being the measure of suitability of the wireless beacon for use as a reference point by a wireless positioning system.

8. The method of claim 1, the information contained by the data points including an estimated location at which radio signals from the wireless beacon were detected, an estimated time at which radio signals from the wireless beacon were detected, and a measure of a strength of radio signals received from the wireless beacon.

9. The method of claim 1, the estimated characteristic including a measure of confidence in the estimated geographic location of the wireless beacon.

10. A system for estimating a characteristic of a wireless beacon, the system comprising:
   a computer-readable memory including instructions that when executed cause a computer system to:
      receive a set of data points, each data point containing information about beacon attributes of a wireless beacon;
      divide at least one dimension into a set of regions, each region of the set having region boundaries that do not overlap with other regions of the set;
      associate each data point with one corresponding region based on at least one element of the information of the data point lying within the boundaries of the corresponding region;
      determine an aggregate attribute for each region based on the information of the data points associated with the corresponding region; and
      estimate the characteristic of the wireless beacon based on at least one aggregate attribute, the characteristic of the wireless beacon being an estimated geographic location of the wireless beacon, a measure of suitability of the wireless beacon for use as a reference point by a wireless positioning system or a measure of confidence in the estimated geographic location of the wireless beacon.

11. The system of claim 10, the estimated characteristic of the wireless beacon being the estimated geographic location of the wireless beacon.

12. The system of claim 11, the at least one dimension being a spatial dimension and the element of the information of the data point being an estimated location at which radio signals from the wireless beacon were detected.

13. The system of claim 12, the aggregate attribute for each region being an aggregate location.

14. The system of claim 10, the at least one dimension being a temporal dimension and the element of the information of the data point being an estimated time at which radio signals from the wireless beacon were detected.

15. The system of claim 14, the aggregate attribute for each region being a count of a number of distinct estimated locations at which radio signals from the wireless beacon were detected, each distinct estimated location being spaced apart from at least one other distinct estimated location by more than a threshold distance.

16. The system of claim 15, the estimated characteristic of the wireless beacon being the measure of suitability of the wireless beacon for use as a reference point by a wireless positioning system.

17. The system of claim 10, the information contained by the data points including an estimated location at which radio signals from the wireless beacon were detected, an estimated time at which radio signals from the wireless beacon were detected, and a measure of a strength of radio signals received from the wireless beacon.

18. The system of claim 10, the estimated characteristic including a measure of confidence in the estimated geographic location of the wireless beacon.

19. The method of claim 1, the beacon attributes including one or more of beacon identifiers, beacon position, quality factors, confidence factors, pathology factors, observation information, or beacon features.

20. The system of claim 10, the beacon attributes including one or more of beacon identifiers, beacon position, quality factors, confidence factors, pathology factors, observation information, or beacon features.

* * * * *